(12) United States Patent
Miwa et al.

(10) Patent No.: US 11,732,154 B2
(45) Date of Patent: Aug. 22, 2023

(54) COATING COMPOSITION AND METHOD FOR FORMING MULTILAYER COATING FILM

(71) Applicant: NIPPON PAINT AUTOMOTIVE COATINGS CO., LTD., Osaka (JP)

(72) Inventors: Yasunori Miwa, Hirakata (JP); Takuhiro Kakii, Hirakata (JP); Takanori Inazumi, Hirakata (JP); Katsumi Mizuguchi, Hirakata (JP); Hiroshi Iida, Hirakata (JP); Takuma Okada, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 470 days.

(21) Appl. No.: 16/766,882

(22) PCT Filed: Nov. 30, 2018

(86) PCT No.: PCT/JP2018/044312
§ 371 (c)(1),
(2) Date: May 26, 2020

(87) PCT Pub. No.: WO2019/107570
PCT Pub. Date: Jun. 6, 2019

(65) Prior Publication Data
US 2021/0363375 A1 Nov. 25, 2021

(30) Foreign Application Priority Data

Dec. 1, 2017 (JP) ................................. 2017-231995

(51) Int. Cl.
| | | |
|---|---|---|
| *B05D 1/36* | (2006.01) | |
| *B05D 1/38* | (2006.01) | |
| *C09D 133/14* | (2006.01) | |
| *C09D 133/06* | (2006.01) | |
| *C09D 7/63* | (2018.01) | |
| *C09D 7/62* | (2018.01) | |
| *B05D 7/00* | (2006.01) | |
| *C08G 18/54* | (2006.01) | |
| *C08G 18/73* | (2006.01) | |
| *C08G 18/80* | (2006.01) | |
| *C08K 3/36* | (2006.01) | |
| *C08K 5/5419* | (2006.01) | |
| *C08K 9/08* | (2006.01) | |
| *C08L 35/06* | (2006.01) | |
| *C08L 61/28* | (2006.01) | |
| *C09D 161/28* | (2006.01) | |
| *C09D 175/04* | (2006.01) | |

(52) U.S. Cl.
CPC ......... *C09D 133/066* (2013.01); *B05D 7/532* (2013.01); *B05D 7/572* (2013.01); *C08G 18/544* (2013.01); *C08G 18/73* (2013.01); *C08G 18/80* (2013.01); *C08K 3/36* (2013.01); *C08K 5/5419* (2013.01); *C08K 9/08* (2013.01); *C09D 7/62* (2018.01); *C09D 7/63* (2018.01); *B05D 2202/10* (2013.01); *B05D 2425/01* (2013.01); *C08K 2201/003* (2013.01); *C08K 2201/011* (2013.01); *C08L 35/06* (2013.01); *C08L 61/28* (2013.01); *C08L 2201/52* (2013.01); *C09D 161/28* (2013.01); *C09D 175/04* (2013.01)

(58) Field of Classification Search
None
See application file for complete search history.

(56) References Cited

U.S. PATENT DOCUMENTS

| | | | | |
|---|---|---|---|---|
| 5,270,392 | A * | 12/1993 | Okude | C08L 33/14 525/207 |
| 5,374,682 | A | 12/1994 | Gouda et al. | |
| 5,508,352 | A | 4/1996 | Sasaki et al. | |
| 5,556,669 | A | 9/1996 | Sasaki et al. | |
| 5,853,809 | A * | 12/1998 | Campbell | C09D 7/68 427/407.1 |
| 5,898,052 | A | 4/1999 | Okumura et al. | |
| 5,902,644 | A | 5/1999 | Okumura et al. | |
| 2002/0015795 | A1* | 2/2002 | Toui | C09D 143/04 427/407.1 |
| 2020/0157374 | A1* | 5/2020 | Nakabayashi | C09D 7/48 |

FOREIGN PATENT DOCUMENTS

| | | |
|---|---|---|
| JP | 4-363374 | 12/1992 |
| JP | 6-108001 | 4/1994 |
| JP | 7-224146 | 8/1995 |

(Continued)

OTHER PUBLICATIONS

Translation of the International Preliminary Report on Patentability and Written Opinion of the International Searching Authority dated Jun. 11, 2020 in International (PCT) Application No. PCT/JP2018/044312.

Extended European Search Report dated Aug. 24, 2021, in corresponding European Patent Application No. 18884630.7.

(Continued)

*Primary Examiner* — Michael J Feely

(74) *Attorney, Agent, or Firm* — Wenderoth, Lind & Ponack, L.L.P.

(57) ABSTRACT

The present invention provides a coating composition capable of forming a coating film having a good appearance and design of a coating film and having coating film properties such as scratch resistance with a good balance. Furthermore, the present invention provides a method for forming a multilayer coating film including forming a coating film using the coating composition of the present invention.

11 Claims, No Drawings

(56) References Cited

FOREIGN PATENT DOCUMENTS

| | | |
|---|---|---|
| JP | 9-100439 | 4/1997 |
| JP | 10-81849 | 3/1998 |
| JP | 11-323243 | 11/1999 |
| JP | 11-335621 | 12/1999 |
| JP | 2001-2983 | 1/2001 |

OTHER PUBLICATIONS

International Search Report (ISR) dated Feb. 26, 2019 in International (PCT) Application No. PCT/JP2018/044312.

* cited by examiner

COATING COMPOSITION AND METHOD FOR FORMING MULTILAYER COATING FILM

TECHNICAL FIELD

The present invention relates to a coating composition. In addition, the present invention relates to a method for forming a multilayer coating film.

BACKGROUND ART

On the surface of an object to be coated such as an automobile body is formed sequentially a plurality of coating films having various roles, and thus the object to be coated is protected and concurrently is provided with a beautiful appearance and an excellent design. In the case of having such a plurality of coating films, what has a great influence on the appearance and the design of the coating films is a coating film particularly called a base coating film or a clear coating film.

In recent years, coating films have been required to have superior coating film performance such as desired hardness in addition to being superior in appearance and design.

For example, the object of the invention of Patent Literature 1 is to provide a clear coating (composition) that forms a coating film with improved sharpness and that does not impair coating film performance such as hardness, processability, and stain resistance of the coating film.

More specifically, Patent Literature 1 discloses a clear coating composition containing 0.01 to 5 parts by weight of (D) an acid catalyst per 100 parts by weight of a resin component composed of 30 to 80 parts by weight of (A) a hydroxyl group-containing polyester resin having a number-average molecular weight of 1,000 to 30,000, a glass transition temperature of −10 to 70° C., a solubility parameter (sp value) of 9.5 to 12.5, and an acid value of less than 50 mgKOH/g, 10 to 50 parts by weight of (B) a high acid value polyester having a number-average molecular weight of 400 to 5,000, a glass transition temperature of −10 to 70° C., and an acid value of 50 to 400 mgKOH/g, and 10 to 40 parts by weight of (C) a melamine resin curing agent (see claim 1 of Cited Literature 1).

The invention of Patent Literature 2 relates to a clear coating composition capable of forming a coating film superior in stain resistance and sharpness.
Patent Literature 2 having this purpose discloses a clear coating composition coating containing 30 to 70 parts by weight of (A) a hydroxyl group-containing acrylic resin containing 15 to 60% by weight of styrene in its constituting monomers and having a number-average molecular weight of 10,000 to 500,000 and a glass transition temperature of −10 to 70° C., 10 to 50 parts by weight of (B) a high acid value polyester having a number-average molecular weight of 400 to 5,000, a glass transition temperature of −10 to 70° C., and an acid value of 50 to 400 mgKOH/g, and 10 to 40 parts by weight of (C) a melamine resin curing agent, wherein the total amount of the components (A), (B) and (C) is 100 parts by weight (see claim 1 of Cited Literature 2).

CITATION LIST

Patent Literature

Patent Literature 1: JP-A-11-335621
Patent Literature 2: JP-A-11-323243

SUMMARY OF THE INVENTION

Technical Problems

However, as described in Patent Literatures 1 and 2, in a clear coating composition containing a melamine resin, an attempt to improve the appearance of a resulting coating film by adjusting the blending amounts of a melamine resin and a plasticizer has caused a problem that coating film properties such as scratch resistance and acid resistance are lowered.

Furthermore, an attempt to improve coating film properties such as scratch resistance and acid resistance by adjusting the blending amounts of the melamine resin and the plasticizer resulted in failure to obtain a desired coating film appearance, such as the occurrence of color reversion.

Thus, there have still not been provided any coating composition capable of forming a coating film having good appearance and good design of the coating film and having well-balanced coating film properties such as scratch resistance has not been provided.

In view of the above-described present situation, the present invention has an object to provide a coating composition capable of forming a coating film having good appearance and good design of the coating film and having well-balanced coating film properties such as scratch resistance. Furthermore, the present invention aims at providing a method for forming a multilayer coating film including forming a coating film using the coating composition of the present invention.

Solution to Problems

The present invention provides the following aspects to solve the aforementioned problems.

[1] A coating composition containing:
  a hydroxyl group-containing acrylic resin (A),
  at least one species selected from the group consisting of a melamine resin (B1) and an unblocked isocyanate compound (B2), and
  a half-ester group-containing copolymer (C) that is a copolymer of a polymerizable unsaturated monomer (a) having a half-esterified acid anhydride group and another copolymerizable monomer (b),
  wherein
  the polymerizable unsaturated monomer (a) has an acid anhydride group half-esterified with a monoalcohol having 1 to 8 carbon atoms, and
  a total acid value of the half-ester group-containing copolymer (C) is 5.0 mgKOH/g or more and 240 mgKOH/g or less.

[2] One embodiment is directed to the above-mentioned coating composition, wherein a number-average molecular weight of the half-ester group-containing copolymer (C) is 1000 or more and 10500 or less.

[3] One embodiment is directed to the above-mentioned coating composition, further containing a blocked isocyanate compound (D).

[4] One embodiment is directed to the above-mentioned coating composition, wherein an acid value of the half-ester group-containing copolymer (C) is 10 mgKOH/g or more and 240 mgKOH/g or less.

[5] In one embodiment, the coating composition as described above, wherein a hydroxyl value of the hydroxyl group-containing acrylic resin (A) is 60 mgKOH/g or more and 200 mgKOH/g or less.

[6] One embodiment is directed to the above-mentioned coating composition, wherein a content of the half-ester group-containing copolymer (C) is 3 parts by mass or more and 25 parts by mass or less per 100 parts by mass of a resin solid content of the coating composition.
[7] One embodiment is directed to the above-mentioned coating composition, wherein a ratio of the melamine resin (B1) and the half-ester group-containing copolymer (C) contained in the coating composition is the melamine resin (B1)/the half-ester group-containing copolymer (C)=1/0.1 to 1/1 as expressed in solid content mass ratio.
[8] One embodiment is directed to the above-mentioned coating composition, further containing a particulate additive (E) including at least one species selected from the group consisting of an organic-inorganic hybrid polymer dispersion, an inorganic particle, and an organic resin-coated inorganic particle.
[9] One embodiment is directed to the above-mentioned coating composition, wherein the average particle diameter of the particulate additive (E) is 10 nm or more and 1000 nm or less.
[10] One embodiment is directed to the above-mentioned coating composition, wherein the coating composition is a clear coating composition.
[11] One embodiment is directed to a method for forming a multilayer coating film, including:
a step of applying a base coating composition to an object to be coated to form a base coating film or an uncured base coating film; and
a step of applying the above-mentioned coating composition to the base coating film or to the uncured base coating film to form a coating film.
[12] One embodiment is directed to a method for forming a multilayer coating film, including:
a step of applying a primer surfacer composition to an object to be coated to form a primer surfacer film or an uncured primer surfacer film,
a step of applying a base coating composition to the resulting primer surfacer film or the uncured primer surfacer film to form a base coating film or an uncured base coating film, and
a step of applying the above-mentioned coating composition to the base coating film or the uncured base coating film to form a coating film.

Effects of Invention

The coating composition of the present invention can form a coating film having good appearance and good design and being superior in scratch resistance and acid resistance.

DESCRIPTION OF EMBODIMENTS

First, the process leading to the present invention will be described.

In recent years, acid/epoxy thermosetting coating compositions (hereinafter referred to as "acid-epo-based coating compositions") have been used. The acid-epo-based coating composition has an advantage of being capable of forming a coating film superior in coating film appearance and coating film properties. However, such a coating composition is high in cost and satisfies industrial standards regarding environmental load, but there is still a possibility that use control of an epoxy component is required.

Furthermore, the acid-epo-based coating composition has a property that it is relatively unsuitable for long-term storage.

On the other hand, for example, any coating composition containing a melamine resin can be suppressed in production cost as compared with the acid-epo-based coating composition, can avoid the problem of use control of the epoxy component as described above, and can have better storage stability.

For example, any coating composition containing an unblocked isocyanate compound can avoid the problem of use control of the epoxy component as described above, and can have better storage stability.

When a coating film is formed from a coating composition containing at least one species selected from the group consisting of a melamine resin and an unblocked isocyanate compound, generally, a coating film having heat resistance and water resistance, and also having good hardness is obtained.

In such a coating composition containing at least one species selected from the group consisting of a melamine resin and an unblocked isocyanate compound, for example, by adjusting the blending amounts of the at least one species selected from the group consisting of a melamine resin and an unblocked isocyanate compound and a plasticizer as described above, generally, the appearance of a resulting coating film can be improved, and coating film properties such as scratch resistance and acid resistance can be improved.

However, when an attempt is made to improve the appearance of a resulting coating film, coating film properties such as scratch resistance and acid resistance tend to be inferior. Similarly, when an attempt is made to improve coating film properties such as scratch resistance and acid resistance of a resulting coating film, the appearance of the resulting coating film tends to be inferior.

Therefore, in a coating composition containing at least one species selected from the group consisting of a melamine resin and an unblocked isocyanate compounds, improvement in the appearance of a resulting coating film and improvement in coating film properties such as scratch resistance and acid resistance tend to conflict with each other, and there is a demand for coating compositions that solve such a problem.

Thus, the present inventors attempted with a coating composition containing at least one species selected from the group consisting of a melamine resin and an unblocked isocyanate compound to improve the appearance of a resulting coating film and concurrently improve coating film properties such as scratch resistance and acid resistance. As a result, the present inventors have found a coating composition that can attain both improvement in the appearance of a resulting coating film and improvement in coating film properties such as scratch resistance and acid resistance and also can afford superior coating film appearance and coating film properties.

More specifically, the coating composition of the present invention can form a coating film superior in smoothness, sharpness, brightness, acid resistance, scratch resistance, etc. In addition, the coating composition of the present invention can obtain unprecedented effects such as improving the appearance of a resulting coating film and suppressing color reversion while being a coating composition containing a melamine resin.

In addition to the above characteristics, acid resistance, hardness and scratch resistance can be further improved due to containing the unblocked isocyanate compound (B2). For example, by containing the unblocked isocyanate compound (B2), it is possible to further improve car wash scratch resistance.

The coating composition of the present invention may contain a melamine resin and an unblocked isocyanate compound. Owing to this combination, the effects exhibited by the melamine resin and the unblocked isocyanate compound can be exhibited. Furthermore, a further improved coating film appearance can be obtained.

Furthermore, by a method for forming a multilayer coating film using the coating composition of the present invention, a coating film having such technical effects can be formed.

The coating composition of the present invention, which has, for example, such technical effects, is a coating composition containing:
a hydroxyl group-containing acrylic resin (A);
at least one species selected from the group consisting of a melamine resin (B1) and an unblocked isocyanate compound (B2); and
a half-ester group-containing copolymer (C) that is a copolymer of a polymerizable unsaturated monomer (a) having a half-esterified acid anhydride group and another copolymerizable monomer (b),
wherein
the polymerizable unsaturated monomer (a) has an acid anhydride group half-esterified with a monoalcohol having 1 to 8 carbon atoms, and
the total acid value of the half-ester group-containing copolymer (C) is 5.0 mgKOH/g or more and 240 mgKOH/g or less.

In one embodiment, the coating composition of the present invention contains:
a hydroxyl group-containing acrylic resin (A);
an unblocked isocyanate compound (B2); and
a half-ester group-containing copolymer (C) that is a copolymer of a polymerizable unsaturated monomer (a) having a half-esterified acid anhydride group and another copolymerizable monomer (b),
and the polymerizable unsaturated monomer (a) has an acid anhydride group half-esterified with a monoalcohol having 1 to 8 carbon atoms, and
the total acid value of the half-ester group-containing copolymer (C) is 5.0 mgKOH/g or more and 240 mgKOH/g or less.

Hereafter, the coating composition in the present disclosure will be described in more detail.

[Hydroxyl Group-Containing Acrylic Resin (A)]

The hydroxyl group-containing acrylic resin (A) contained in the coating composition according to the present invention has a hydroxyl value (OHV) of 60 mgKOH/g or more and 200 mgKOH/g or less, or 65 mgKOH/g or more and 200 mgKOH/g or less in another embodiment, or 70 mgKOH/g or more and 200 mgKOH/g or less in another embodiment.

Owing to the condition that the hydroxyl value of the hydroxyl group-containing acrylic resin (A) is within such a range, the hydroxyl group-containing acrylic resin can be sufficiently crosslinked. Furthermore, good solvent resistance and weatherability can be imparted to a coating film formed by applying a coating composition to an object to be coated, in some embodiments, a base coating film. In addition, good water resistance can be imparted to coating films formed from the coating composition disclosed in the present disclosure.

In one embodiment, the hydroxyl group-containing acrylic resin (A) has a number-average molecular weight (Mn) of 1500 or more and 11000 or less.

The hydroxyl group-containing acrylic resin (A) preferably has a number-average molecular weight (Mn) of 1500 or more and 10000 or less, or 1500 or more and 8000 or less in one embodiment, or 1800 or more and 7000 or less in another embodiment.

Owing to the condition that the number-average molecular weight (Mn) of the hydroxyl group-containing acrylic resin (A) is within such a range, when the coating composition according to the present disclosure is applied to an object to be coated, e.g., a base coating film in some embodiments, mixing of phases due to wet-on-wet application of the coating composition and a base coating film (lower layer) can be suppressed, so that the appearance (finished appearance) of the coating film formed by applying the coating composition to the base coating film can be improved.

Furthermore, owing to the condition that the number-average molecular weight (Mn) of the hydroxyl group-containing acrylic resin (A) is within such a range, the rise of the viscosity which the coating composition of the present disclosure has when it is applied to an object to be coated, e.g., a base coating film in some embodiments (the viscosity in application), can be suppressed, so that the appearance (finished appearance) of the coating film formed from the coating composition of the present disclosure can be improved.

Furthermore, since the viscosity suitable for the application of the coating composition of the present disclosure can be maintained, the dilution with a solvent can be suppressed.

The number-average molecular weight (Mn) as referred to in the present disclosure means a number-average molecular weight in terms of styrene homopolymers using gel permeation chromatography.

The hydroxyl group-containing acrylic resin (A) preferably has a glass transition temperature (Tg) of −20° C. or higher and 70° C. or lower, or −20° C. or higher and 50° C. or lower in some embodiments, and the glass transition temperature (Tg) is −10° C. or higher and 40° C. or lower in some embodiments. For example, the glass transition temperature may be −5° C. or higher and 25° C. or lower.

Owing to the condition that the glass transition temperature of the hydroxyl group-containing acrylic resin (A) is within the above range, the hardness of a coating film formed from the coating composition of the present disclosure can be maintained high. In addition, the rise of the viscosity which the coating composition of the present disclosure has when it is applied to an object to be coated, e.g., a base coating film in some embodiments (the viscosity in application), can be suppressed, so that the appearance (finished appearance) of the coating film formed from the coating composition of the present disclosure can be improved. Furthermore, since the viscosity suitable for the application of the coating composition of the present disclosure can be maintained, the dilution with a solvent can be suppressed.

In the present disclosure, the glass transition temperature (Tg) can be measured by a known method.

Use of an acrylic resin having such properties as the hydroxyl group-containing acrylic resin (A) can improve the quick-drying property of the coating composition and can afford a superior coating film appearance to a coating film.

In one embodiment, examples of a monomer composition suitable for producing the hydroxyl group-containing acrylic resin (A) includes compositions each containing at least one species selected from among hydroxyl group-containing acrylic acid hydroxy esters including 2-hydroxyethyl acrylate and 4-hydroxybutyl acrylate; and hydroxyl group-containing methacrylic acid hydroxy esters including 2-hydroxyethyl methacrylate and 4-hydroxybutyl methacrylate, and, if necessary, at least one species selected from among acrylic acid; acrylates including methyl acrylate, butyl acrylate, isobutyl acrylate, t-butyl acrylate, 2-ethylhexyl acrylate, lauryl acrylate, and isobornyl acrylate; methacrylic acid; methacrylates including methyl methacrylate, butyl methacrylate, isobutyl methacrylate, t-butyl methacrylate, 2-ethylhexyl methacrylate, lauryl methacrylate, and isobornyl methacrylate; and an ethylenically unsaturated monomers with an aromatic ring including styrene. The formulation of the monomer composition may be appropriately adjusted according to physical properties required for the hydroxyl group-containing acrylic resin.

The monomer composition can be polymerized using a solvent, for example, such as butyl acetate. The polymerization conditions such as the type of solvent, the concentration of the monomer composition at the time of polymerization, the type and amount of the polymerization initiator, the polymerization temperature and the polymerization time are not particularly limited and are appropriately adjusted according to physical properties required for the hydroxyl group-containing acrylic resin (A). Therefore, the method for producing the hydroxyl group-containing acrylic resin (A) is not particularly limited.

The amount of the hydroxyl group-containing acrylic resin (A) contained in the coating composition in the present disclosure is 50 parts by mass or more and 80 parts by mass or less, and preferably 50 parts by mass or more and 75 parts by mass or less per 100 parts by mass of the resin solid content of the coating composition according to the present disclosure. The hydroxyl group-containing acrylic resin (A) may be used singly or two or more species thereof may be used in combination. When a plurality of species of the hydroxyl group-containing acrylic resin (A) are used, the total amount of the hydroxyl group-containing acrylic resins (A) may be adjusted appropriately such that it falls within the above range.

Herein, "100 parts by mass of the resin solid content of the coating composition according to the present disclosure" means that when a hydroxyl group-containing acrylic resin (A), at least one species selected from among a melamine resin (B1) and an unblocked isocyanate compound (B2), and a half-ester group-containing copolymer (C) are contained, the total of the resin solid contents of the component (A), the component (B1), the component (B2) and the component (C) is 100 parts by mass.

In another embodiment, when the coating composition according to the present disclosure contains a blocked isocyanate compound (D) in addition to the components (A) to (C), the total of the resin solid contents of the component (A) to the component (D) is adjusted to 100 parts by mass. In the following description, the same applies to any case where 100 parts by mass of the resin solid content is referred to unless otherwise stated. Unless otherwise stated, the total of the component (B) means the total amount of the component (B1) and the component (B2).

[Melamine Resin (B1)]

The melamine resin (B1) generally means a thermosetting resin synthesized from melamine and an aldehyde and has three reactive functional groups —$NX^1X^2$ in one molecule of a triazine nucleus. Examples of the melamine resin include the following four types: a full alkyl type containing —$N$—$(CH_2OR)_2$ (R is an alkyl group, the same shall apply hereinafter) as a reactive functional group; a methylol group type containing —$N$—$(CH_2OR)(CH_2OH)$ as a reactive functional group; an imino group type containing —$N$—$(CH_2OR)(H)$ as a reactive functional group; and a methylol/imino group type containing —$N$—$(CH_2OR)(CH_2OH)$ and —$N$—$(CH_2OR)(H)$ or containing —$N$—$(CH_2OH)(H)$ as a reactive functional group.

Owing to the condition that the coating composition in the present disclosure includes the melamine resin (B1), a coating film formed from the coating composition is superior in impact resistance and can have a superior appearance.

In the present disclosure, the melamine resin is not particularly limited, and the coating composition according to the present disclosure may be, for example, an alkyl-etherified melamine resin described later or may contain a commercially available melamine resin.

(Alkyl-Etherified Melamine Resin)

In one embodiment, the melamine resin (B1) may contain an alkyl-etherified melamine resin. For example, an alkyl-etherified melamine resin having an average number of imino groups per triazine nucleus in the resin of less than 1.0 and a number-average molecular weight of less than 1000 may be contained.

When the average number of imino groups per triazine nucleus is less than 1.0, the average number of imino groups is preferably 0.01 or more and 0.3 or less, and the number-average molecular weight is preferably 300 to 900.

In another embodiment, the resin may be an alkyl-etherified melamine resin having an average number of imino groups per triazine nucleus in the resin of 1.0 or more and a number-average molecular weight of 300 to 2500. In some embodiments, the number of imino groups is 1.2 to 2.5 per triazine nucleus. When the average number of imino groups per triazine nucleus is 1.0 or more, the number-average molecular weight is more preferably 400 to 1200, and even more preferably 500 to 1100.

An alkyl-etherified melamine resin having such characteristics can maintain good curability in the case of having formed a coating film and is capable of affording a good coating film appearance.

In the present description, a value converted from a measurement obtained using a GPC (gel permeation chromatogram) into a polystyrene polymer molecular weight is used as a number-average molecular weight.

Preferably, the alkyl-etherified melamine resin is an alkyl etherified melamine resin having an average number of imino groups per triazine nucleus of less than 1.0 and a number-average molecular weight of less than 1000.

Owing to containing such an alkyl-etherified melamine resin, the melamine resin (B1) can suppress a reactive curing rate of a coating film to be formed from the coating composition in the present disclosure, for example, when a multilayer coating film is formed by a 3-coat 1-bake method. Thus, in the formed multilayer coating film, the reactive curing rate of the coating film formed from the coating composition of the present disclosure can be approximated to the reactive curing rate at the time of forming a primer surfacer film, a base coating film, etc., and the appearance of the resulting multilayer coating film can be improved.

For example, the alkyl-etherified melamine resin having an average number of imino groups per triazine nucleus of less than 1.0 and a number-average molecular weight of less than 1000 can be prepared by reacting some of the amino groups of melamine (2,4,6-triamino-1,3,5-triazine) with formaldehyde to methylolate, and subsequently alkyl-etherifying some of the resulting methylol groups with alcohol.

Melamine has three amino groups (—NH$_2$) bonded to the carbon atoms of the triazine nucleus constituting the melamine. Since formaldehyde can be added to the two hydrogen atoms constituting such an amino group, it is theoretically possible to add 6 mol of formaldehyde to 1 mol of melamine, thereby introducing six methylol groups to one triazine nucleus. Alkyl etherification can be performed by reacting an alcohol with the methylol groups thus introduced into melamine.

In one embodiment of the present disclosure, in methylolation using formaldehyde, the methylolation can be performed by reacting all the hydrogen atoms of the amino groups of melamine, or alternatively the hydrogen atoms may be reacted to an extent where less than 1.0, preferably 0.01 to 0.5 imino groups (—NH—CH$_2$OR, wherein R is H or an alkyl group) per triazine nucleus are allowed to remain. When the number of imino groups in the alkyl-etherified melamine resin is less than 1.0 per triazine nucleus, the storage stability of the coating composition can be satisfactorily maintained. The content of imino groups is preferably 0.01 to 0.5 groups per triazine nucleus from the viewpoint of improving the appearance of a multilayer coating film.

In the alkyl etherification, a monohydric alcohol having 1 to 4 carbon atoms is used as the alcohol to be reacted with the methylol groups introduced into melamine. Examples of such alcohol include methyl alcohol, ethyl alcohol, propyl alcohol, isopropyl alcohol, n-butyl alcohol, and isobutyl alcohol. The alcohol to be used in the alkyl etherification reaction may be one species, or two or more species thereof may be used in combination. For example, alkyl etherification may be performed using two species of alcohol such as methyl alcohol and butyl alcohol. The methylolation reaction and the alkyl etherification reaction can be performed by known methods. Moreover, it is preferable from the viewpoint of the coating film appearance at the time of forming a coating film that methyl alcohol or a combination of methyl alcohol and butyl alcohol together is used for the alkyl etherification.

The alkyl-etherified melamine resin having an average number of imino groups per triazine nucleus of less than 1.0 and a number-average molecular weight of less than 1000 preferably has a ratio of methyl groups/butyl groups in the alkyl etherified moiety of 50/50 to 100/0 expressed in molar ratio. When the ratio of methyl groups/butyl groups is less than 50/50, the appearance may deteriorate when a coating film is formed. The ratio of methyl groups/butyl groups is more preferably 55/45 to 100/0, and even more preferably 60/40 to 100/0.

The thus prepared alkyl-etherified melamine resin having an average number of imino groups per triazine nucleus of less than 1.0 is configured to have a number-average molecular weight of less than 1000. If the number-average molecular weight is 1000 or more, the smoothness achieved when a coating film is formed deteriorates. The number-average molecular weight is preferably 300 to 900, and more preferably 300 to 700.

In the present disclosure, the alkyl-etherified melamine resin may be used singly, or other melamine resins described in detail below may be used in combination.

When the alkyl-etherified melamine resin and other melamine resin are used in combination, the content ratio of the alkyl etherified melamine resin and the other melamine resin is particularly preferably 10/90 to 45/55.

(Other Melamine Resins)

As the melamine resin (B1), in addition to the alkyl-etherified melamine resin described above, other melamine resin may be used in combination. The type thereof is not particularly limited, and any of methylol group type, imino group type, and methylol/imino group type can be suitably used. Examples thereof include "CYMEL-303", "CYMEL 254", "U-VAN 128", "U-VAN 225", "U-VAN 226", "U-VAN 325" and "U-VAN 20N60" commercially available from Mitsui Cytec Ltd., and "SUMIMAL Series" commercially available from Sumitomo Chemical Co., Ltd.

The amount of the melamine resin (B1) contained in the coating composition in the present disclosure is 10 parts by mass or more and 35 parts by mass or less, and preferably 15 parts by mass or more and 30 parts by mass or less, per 100 parts by mass of the resin solid content of the coating composition according to the present disclosure.

Owing to the condition that the content of the melamine resin (B1) is within the above range, a good appearance can be imparted to a coating film to be formed from the coating composition according to the present disclosure. For example, good smoothness, sharpness, and brightness of a coating film can be obtained. In addition, good acid resistance, scratch resistance, and surface hardness can be imparted to a coating film to be formed from the coating composition according to the present disclosure.

The melamine resin (B1) may be used singly or two or more species thereof may be used in combination. When a plurality of species of the melamine resin (B1) are used, the total amount of the melamine resin (B1) can be adjusted appropriately to fall within the above range.

Herein, "100 parts by mass of the resin solid content of the coating composition according to the present disclosure" means that when a hydroxyl group-containing acrylic resin (A), a melamine resin (B1), and a half-ester group-containing copolymer (C) are contained, the total of the resin solid contents of the components (A) to (C) is 100 parts by mass.

When the coating composition according to the present disclosure contains a blocked isocyanate compound (D) in addition to the components (A) to (C), the total resin solid content of the components (A) to (D) is 100 parts by mass. In the following description, the same applies to any case where 100 parts by mass of the resin solid content is referred to unless otherwise stated.

[Unblocked Isocyanate Compound (B2)]

The unblocked isocyanate compound (B2) is an isocyanate compound in which the isocyanate group contained in the compound is not blocked with a blocking agent. That is, it is an isocyanate compound that does not contain the blocked isocyanate compound (D) described later.

Owing to the condition that the coating composition according to the present disclosure contains the unblocked isocyanate compound (B2), for example, the unblocked isocyanate compound (B2) can be cured as a result of reacting with functional groups contained in at least one species selected from the hydroxyl group-containing acrylic resin (A) and the half-ester group-containing copolymer (C).

In addition, the coating composition according to the present disclosure can have superior appearance and can form a coating film having acid resistance, hardness, and scratch resistance as a result of having the unblocked isocyanate compound (B2). In addition, since the coating composition can be baked at a temperature of 100° C. or lower, it can be applied to various objects to be coated and is advantageous from the viewpoint of energy saving.

In one embodiment, the coating composition according to the present disclosure may contain both the melamine resin (B1) and the unblocked isocyanate compound (B2), and in another embodiment, the coating composition may contain the unblocked isocyanate compound (B2). By containing the unblocked isocyanate compound (B2), it can further improve the acid resistance, hardness and scratch resistance of a resulting coating film.

Examples of the unblocked isocyanate compound (B2) include aliphatic, alicyclic, aromatic group-containing aliphatic, or aromatic polyisocyanate compounds, and preferable examples thereof include diisocyanates, dimers of diisocyanates, and trimers of diisocyanates (preferably, isocyanurate type isocyanates (so-called isocyanurates)). Such a polyisocyanate compound may be of a so-called asymmetric type.

As the diisocyanate, those containing generally 5 to 24, and preferably 5 to 18 carbon atoms can be used. Examples of such a diisocyanate include trimethylene diisocyanate, tetramethylene diisocyanate, hexamethylene diisocyanate (HDI), pentamethylene diisocyanate (PDI), 2,2,4-trimethylhexane diisocyanate, undecane diisocyanate-(1,11), lysine ester diisocyanate, cyclohexane-1,3- and 1,4-diisocyanate, 1-isocyanato-3-isocyanatomethyl-3,5,5-trimethylcyclohexane (isophorone diisocyanate: IPDI), 4,4'-diisocyanato-dicyclomethane, ω,ω'-dipropyl ether diisocyanate, thiodipropyl diisocyanate, cyclohexyl-1,4-diisocyanate, dicyclohexylmethane-4,4'-diisocyanate (HMDI), 1,5-dimethyl-2,4-bis(isocyanatomethyl)benzene, 1,5-trimethyl-2,4-bis(ω-isocyanatoethyl)-benzene, 1,3,5-trimethyl-2,4-bis(isocyanatomethyl)benzene, 1,3,5-triethyl-2,4-bis(isocyanatomethyl)benzene, and dicyclohexyldimethylmethane-4,4'-diisocyanate. Further, an aromatic diisocyanate such as 2,4-diisocyanatotoluene and/or 2,6-diisocyanatotoluene, 4,4'-diisocyanatodiphenylmethane, and 1,4-diisocyanatoisopropylbenzene also may be used. In addition, examples of the isocyanurate type isocyanates include trimers of the above-mentioned diisocyanates. Such polyisocyanate compounds may be used singly or two or more species thereof may be used in combination.

Examples of derivatives of polyisocyanates include various derivatives such as dimer, trimer, biuret, allophanate, carbodiimide, uretdione, uretonimine, isocyanurate, and iminooxadiazinedione of the aforementioned polyisocyanate compounds.

Among these polyisocyanates, aliphatic diisocyanates, alicyclic diisocyanates and derivatives thereof are preferred from the viewpoint of being superior in the weatherability of cured coating films, and hexamethylene diisocyanate (HDI), pentamethylene diisocyanate (PDI), derivatives of pentamethylene diisocyanate, derivatives of hexamethylene diisocyanate, isophorone diisocyanate (IPDI), derivatives of isophorone diisocyanate, dicyclohexylmethane-4,4'-diisocyanate (HMDI), and derivatives of dicyclohexylmethane-4,4'-diisocyanate are more preferred.

It is preferable that at least a part of the polyisocyanate compound to be used in the present invention be an isocyanurate type isocyanate compound. That is, in the present invention, the isocyanurate type isocyanate compound may be used in the form of a mixture in combination with another aliphatic, alicyclic, aromatic group-containing aliphatic, or aromatic polyisocyanate compound (preferably the aforementioned diisocyanate). In this case, the content ratio of the isocyanurate type isocyanate compound in the total amount of the polyisocyanate compound is preferably 60% by mass or more. By having such a relationship, a coating film having even better acid resistance can be obtained.

In the coating composition of the present invention, the equivalent ratio (NCO/OH) of the hydroxyl groups in the hydroxyl group-containing acrylic resin (A) and the isocyanate groups in the unblocked isocyanate compound (B2) is preferably 0.5 or more and 2.0 or less, and more preferably, for example, 0.8 or more and 1.5 or less, from the viewpoint of being superior in the curability and coating stability of the coating composition.

The amount of the unblocked isocyanate compound (B2) contained in the coating composition in the present disclosure is 10 parts by mass or more and 50 parts by mass or less, preferably 15 parts by mass or more and 45 parts by mass or less, for example, 20 parts by mass or more and 45 parts by mass or less, per 100 parts by mass of the resin solid content of the coating composition according to the present disclosure.

Owing to the condition that the content of the unblocked isocyanate compound (B2) is within the above range, a good appearance can be imparted to a coating film to be formed from the coating composition according to the present disclosure. For example, good smoothness, sharpness, and brightness of a coating film can be obtained. In addition, good acid resistance, scratch resistance, and surface hardness can be imparted to a coating film to be formed from the coating composition according to the present disclosure.

The unblocked isocyanate compound (B2) may be used singly or a plurality of species thereof may be used in combination. When a plurality of species of the unblocked isocyanate compound (B2) are used, the total amount of the unblocked isocyanate compound (B2) can be adjusted appropriately to fall within the above range.

In one embodiment, when the coating composition according to the present disclosure contains a melamine resin (B1) and an unblocked isocyanate compound (B2), the total amount of the melamine resin (B1) and the unblocked isocyanate compound (B2) can be appropriately adjusted to 10 parts by mass or more and 55 parts by mass or less, for example, 15 parts by mass or more and 50 parts by mass or less, per 100 parts by mass of the resin solid content of the coating composition according to the present disclosure.

Herein, "100 parts by mass of the resin solid content of the coating composition according to the present disclosure" means, as described above, that when a hydroxyl group-containing acrylic resin (A), at least one species selected from among a melamine resin (B1) and an unblocked isocyanate compound (B2), and a half-ester group-containing copolymer (C) are contained, the total of the resin solid contents of the component (A), the component (B1), the component (B2) and the component (C) is 100 parts by mass.

[Half-Ester Group-Containing Copolymer (C)]

The coating composition in the present disclosure contains a half ester group-containing copolymer (C) that is a copolymer of a polymerizable unsaturated monomer (a) having a half-esterified acid anhydride group and another copolymerizable monomer (b), wherein the polymerizable unsaturated monomer (a) has an acid anhydride group half-esterified with a monoalcohol having 1 to 8 carbon atoms, and the total acid value of the half-ester group-containing copolymer (C) is 5.0 mgKOH/g or more and 240 mgKOH/g or less.

Although the composition in the present disclosure is a coating composition containing the melamine resin (B1) due to the inclusion of the specific half-ester group-containing copolymer (C) according to the present disclosure, a resulting coating film has a superior coating film appearance, for example, superior smoothness, sharpness, and brightness, and also has such superior coating properties as superior scratch resistance and acid resistance.

Further, even in the coating composition containing the unblocked isocyanate compound (B2), a resulting coating film is superior in coating film appearance, for example, superior smoothness, sharpness, and brightness, and it can have superior coating film properties such as superior scratch resistance and acid resistance.

Therefore, the coating composition in the present disclosure can have superior coating film appearance, e.g., superior smoothness, sharpness, and brightness, with suppressed color shift (color reversion), also can have superior coating film properties, and has been made possible to have these technical effects with a good balance, which have conventionally been believed difficult to attain.

Moreover, in addition to maintaining such technical effects with a good balance, it is possible to provide, for example, a better coating film appearance as compared with conventional coating compositions.

The total acid value of the half-ester group-containing copolymer (C) according to the present disclosure is 5.0 mgKOH/g or more and 240 mgKOH/g or less, and in one embodiment, the total acid value of the half-ester group-containing copolymer (C) is 5.5 mgKOH/g or more and 240 mgKOH/g or less, and in another embodiment, the total acid value of the half-ester group-containing copolymer (C) is 10 mgKOH/g or more and 240 mgKOH/g.

Owing to the condition that the total acid value of the half-ester group-containing copolymer (C) is within such a range, a resulting film is superior in smoothness, sharpness, and brightness, as well as superior in such physical properties as scratch resistance and acid resistance. Pencil hardness can indicate hardness desired in an automotive application, for example.

In one embodiment, the number-average molecular weight of the half-ester group-containing copolymer (C) is 1000 or more and 10500 or less, and in another embodiment, the number-average molecular weight of the half-ester group-containing copolymer (C) is 1500 or more and 10000 or less, and for example, the number-average molecular weight of the half-ester group-containing copolymer (C) is 2000 or more and 10000 or less.

Owing to the condition that the number-average molecular weight of the half-ester group-containing copolymer (C) is within such a range, a coating film superior in smoothness, sharpness and brightness can be formed.

The half-ester group-containing copolymer (C) according to the present invention is a copolymer of a polymerizable unsaturated monomer (a) having a half-esterified acid anhydride group and another copolymerizable monomer (b). Furthermore, the polymerizable unsaturated monomer (a) that is a monomer to constitute the half-ester group-containing copolymer (C) has an acid anhydride group half-esterified with a monoalcohol having 1 to 8 carbon atoms.

In one embodiment, the content of the half-ester group-containing copolymer (C) is 3 parts by mass or more and 25 parts by mass or less, and preferably 3 parts by mass or more and 20 parts by mass or less, for example, 3 parts by mass or more and 15 parts by mass or less, per 100 parts by mass of the resin solid content of the coating composition according to the present disclosure.

Owing to containing the half-ester group-containing copolymer (C) within such a range, a good appearance can be imparted to a coating film to be formed from the coating composition according to the present disclosure. For example, good smoothness, sharpness, and brightness of a coating film can be obtained. In addition, good acid resistance, scratch resistance, and surface hardness can be imparted to a coating film to be formed from the coating composition according to the present disclosure.

In particular, in the present disclosure, by using at least one species selected from the group consisting of a melamine resin (B1) and an unblocked isocyanate compound (B2) and a half-ester group-containing copolymer (C), it is possible to impart more improved sharpness, brightness and acid resistance to a coating film to be formed from the coating composition of the present disclosure.

The half-ester group-containing copolymer (C) may be used singly, or a plurality of species of the half-ester group-containing copolymers (C) may be used in combination.

In one embodiment, the ratio of the melamine resin (B1) and the half-ester group-containing copolymer (C) contained in the coating composition according to the present disclosure is the melamine resin (B1)/the half-ester group-containing copolymer (C)=1/0.1 to 1/1, for example, the melamine resin (B1)/the half-ester group-containing copolymer (C)=1.0/4 to 1/1, as expressed in solid content mass ratio.

Owing to the condition that the ratio of the melamine resin (B1)/the half-ester group-containing copolymer (C) has a relationship within such a range, a coating film formed from the coating composition is superior in acid resistance and scratch resistance, and can remarkably suppress color reversion and, for example, can obtain an effect of having superior smoothness, sharpness, and brightness.

In one embodiment, the ratio of the unblocked isocyanate compound (B2) and the half-ester group-containing copolymer (C) contained in the coating composition according to the present disclosure, as expressed in solid content mass ratio, is just required to be the unblocked isocyanate compound (B2)/the half-ester group-containing copolymer (C)=1/1 or less, for example, is 1.0/001 to 1/1.

Owing to the condition that the ratio of the unblocked isocyanate compound (B2)/the half-ester group-containing copolymer (C) has a relationship within such a range, a coating film formed from the coating composition is superior in acid resistance and scratch resistance, and can remarkably suppress color reversion and, for example, can obtain an effect of having superior smoothness, sharpness, and brightness.

Even when both the melamine resin (B1) and the unblocked isocyanate compound (B2) are contained, the above relationship can be possessed.

(Polymerizable Unsaturated Monomer Having a Half-Esterified Acid Anhydride Group (a))

The polymerizable unsaturated monomer (a) has a half-esterified acid anhydride group.

Owing to the condition that the polymerizable unsaturated monomer (a) has a half-esterified acid anhydride group, a coating film to be formed from the coating composition according to the present disclosure can remarkably suppress color reversion and can have superior smoothness, sharpness and brightness, for example.

Owing to the condition that the polymerizable unsaturated monomer (a) has a half-esterified acid anhydride group, an interaction on the curing reaction of the hydroxyl group-containing acrylic resin (A) with at least one species selected from the group consisting of a melamine resin (B1) and an unblocked isocyanate compound (B2) is obtained, so that distortion caused by the curing reaction can be effectively suppressed and color reversion can be suppressed. That is, the coating film can have a superior coating film appearance and have superior coating film properties (e.g., acid resistance and scratch resistance).

The polymerizable unsaturated monomer having an acid anhydride group in the polymerizable unsaturated monomer (a) having a half-esterified acid anhydride group is not particularly limited. Examples thereof include maleic anhydride, succinic anhydride, itaconic anhydride, citraconic anhydride, phthalic anhydride, oxydiphthalic anhydride, naphthalenedicarboxylic anhydride, trimellitic anhydride, and pyromellitic anhydride. From the viewpoint that the reactivity and the weatherability of a coating film can be further improved, at least one of maleic anhydride and itaconic anhydride can be suitably used.

The polymerizable unsaturated monomer (a) having a half-esterified acid anhydride group can be prepared by half-esterifying a monoalcohol by reacting it with an acid anhydride group derived from a polymerizable unsaturated monomer unit having an acid anhydride group.

The monoalcohol is a monoalcohol having 1 to 8 carbon atoms. If a coating composition according to the present disclosure containing a polymerizable unsaturated monomer (a) with an acid anhydride group half-esterified with a monoalcohol having such a number of carbon atoms is used, a coating film obtained therefrom is superior in coating film appearance and can be superior in coating film properties (e.g., acid resistance and scratch resistance).

Therefore, since half-esterification can be performed without using any substance having a large environmental load such as decanol, which has 10 carbon atoms, the coating composition in the present disclosure can provide an environmentally friendly coating composition.

A monoalcohol having 1 to 8 carbon atoms is an organic compound having one hydroxyl group in one molecule, and examples thereof include alkanols such as methanol, ethanol, propanol, butanol, pentanol, hexanol, heptanol, and octanol; monoalkyl ethers of alkylene glycols such as ethylene glycol monomethyl ether and ethylene glycol monoethyl ether; and dialkylaminoalkanols such as dimethylaminoethanol.

The monoalcohol to be used for the half-esterification may have, for example, 1 to 7 carbon atoms, and preferably has 1 to 6 carbon atoms. Owing to the condition that the number of carbon atoms is within such a range, a resulting coating film can be superior in coating film appearance and can be superior in coating film properties (e.g., acid resistance and scratch resistance).

The number of acid anhydride groups obtained by half-esterification is not particularly limited. For example, a part of the acid anhydride groups in the half-ester group-containing copolymer (C) is half-esterified through a half-esterification reaction, and the product can have 0.5 to 3.0, preferably 0.7 to 1.5 acid anhydride groups on average in one molecule.

Further, there may be prepared a half-ester group-containing copolymer (C) having 5 to 30, preferably 6 to 25 half-ester groups on average in one molecule, wherein the ratio of the number of acid anhydride groups to the total number of acid anhydride groups and half-ester groups is within the range of 4 to 20%, preferably 5 to 15%.

The half-esterification reaction can be carried out by appropriately reacting in an organic solvent inert to the reaction under ordinary conditions, for example, at a temperature of 60 to 150° C. for 2 to 7 hours.

(Other Copolymerizable Monomer (b))

The other copolymerizable monomer (b) is a compound copolymerizable with the polymerizable unsaturated monomer (a) having an acid anhydride group, and examples thereof include C1 to C24 alkyl esters of acrylic acid or methacrylic acid such as methyl (meth)acrylate, ethyl (meth)acrylate, propyl (meth)acrylate, n-butyl (meth)acrylate, isobutyl (meth)acrylate, t-butyl (meth)acrylate, 2-ethylhexyl (meth)acrylate, lauryl (meth)acrylate, and stearyl (meth)acrylate; vinyl aromatic compounds such as styrene, α-methylstyrene, and vinyltoluene; olefins such as ethylene and propylene; unsaturated nitriles such as acrylonitrile, methacrylonitrile; unsaturated amides such as acrylamide, methacrylamide, and N-methylacrylamide; and vinyl compounds such as vinyl acetate, vinyl chloride, 2-vinylpyridine, and 4-vinylpyridine.

The copolymerization ratio of the polymerizable unsaturated monomer (a) having a half-esterified acid anhydride group and the other copolymerizable monomer (b) constituting the half-ester group-containing copolymer (C) may be chosen appropriately as long as the total acid value of the half-ester group-containing copolymer (C) is 5.0 mgKOH/g or more and 240 mgKOH/g or less.

For example, when the total amount of the polymerizable unsaturated monomer (a) having a half-esterified acid anhydride group and the other copolymerizable monomer (b) is used as a standard, the monomer (a) can be copolymerized in the range of 5 to 50% by weight, particularly 10 to 40% by weight, preferably 15 to 30% by weight, and the monomer (b) can be copolymerized in the range of 50 to 95% by weight, particularly 60 to 90% by weight, preferably 70 to 85% by weight.

[Blocked Isocyanate Compound (D)]

The coating composition of the present disclosure may further contain a blocked isocyanate compound (D).

The blocked isocyanate compound (D) can be prepared by making a blocking compound, such as a compound having an active methylene group, a ketone compound, or a caprolactam compound, undergo an addition reaction with an aliphatic diisocyanate such as hexamethylene diisocyanate, an alicyclic diisocyanate such as dicyclohexylmethane diisocyanate, bis(isocyanatomethyl)cyclohexane, isophorone diisocyanate, and a nurate body thereof. In such a blocked isocyanate compound (D), the blocking agent is dissociated by heating to generate an isocyanate group, which then reacts with functional groups contained in at least one species selected from the group consisting of the hydroxyl group-containing acrylic resin (A), the melamine resin (B1), and the unblocked isocyanate compound (B2) and at least one species of a half-ester group-containing copolymer (C) contained in the coating composition of the present disclosure, and thus it can cause curing.

For example, the blocked isocyanate compound (D) may be contained in the composition according to the present disclosure in an embodiment containing the melamine resin (B1). By combining the melamine resin (B1) and the blocked isocyanate compound (D), the coating composition according to the present disclosure can have good curability, and a resulting coating film can exhibit superior coating film appearance, especially, superior sharpness.

Examples of the compound having an active methylene group include active methylene compounds such as acetylacetone, ethyl acetoacetate, and ethyl malonate. Examples of the ketone compound include methyl ethyl ketone and methyl isobutyl ketone. Examples of the caprolactam compound include ε-caprolactam. Among these, blocked isocyanate compounds prepared by making an active methylene compound or a ketone compound undergo an addition reaction with hexamethylene diisocyanate or a nurate body thereof are more preferably used.

Specific examples of the blocked isocyanate compound (D) include the DURANATE (blocked hexamethylene diisocyanate) series manufactured by Asahi Kasei Corporation, more specifically, DURANATE MF-K60X, which is an active methylene type blocked isocyanate, and Sumidur BL3175, Desmodur BL3272MPA, Desmodur BL3475 BA/SN, Desmodur BL3575/1 MPA/SN, Desmodur BL4265 SN, Desmodur BL5375 MPA/SN, and Desmodur VP LS2078/2 manufactured by Bayer AG.

In the present disclosure, the blocked isocyanate compound (D) may be added as desired. For example, when the coating composition of the present disclosure contains the blocked isocyanate compound (D), the amount of the blocked isocyanate compound (D) is 1 part by mass or more and 15 parts by weight or less, preferably 3 parts by mass or more and 15 parts by weight or less, for example, 5 parts by mass or more and 13 parts by weight or less, per 100 parts by mass of the resin solid content of the coating composition according to the present disclosure.

Owing to the condition that the coating composition of the present disclosure contains the blocked isocyanate compound (D) within such a range, it can have good curability, and a formed coating film can exhibit superior coating film appearance, especially, superior sharpness.

Here, when the coating composition according to the present disclosure contains the blocked isocyanate compound (D), the resin solid content of 100 parts by mass shall be 100 parts by mass of the total resin solid of the resin components (A) through (D). In the following description, the same applies to any case where 100 parts by mass of the resin solid content is referred to unless otherwise stated.

[Particulate Additive (E)]

In one embodiment, the coating composition of the present disclosure contains a particulate additive (E), and the particulate additive (E) includes at least one species selected from the group consisting of an organic-inorganic hybrid polymer dispersion, an inorganic particle, and an organic resin-coated inorganic particle.

Owing to containing the particulate additive (E), for example, a coating film having better scratch resistance can be obtained.

Known particles can be used as the organic-inorganic hybrid polymer dispersion, the inorganic particles, and the organic resin-coated inorganic particles. The organic-inorganic hybrid polymer may contain, for example, a silicone oligomer and a silane compound as inorganic components. Furthermore, it may contain a radically polymerizable unsaturated monomer as an organic component.

Known inorganic particles and organic resin-coated inorganic particles may be used. For example, silica particles, acrylic resin-coated silica particles, etc. may be contained.

For example, AEROSIL R805, R812, R812S, R816, etc. manufactured by Aerosil may be contained as the inorganic particles. For example, NANOBYK-3652, 3651, 3650 manufactured by BYK, and Tivida AS1010 manufactured by Merck KGaA may be contained as the organic resin-coated inorganic particles.

The average particle diameter of the particulate additive (E) is 10 nm or more and 1000 nm or less, for example, 20 nm or more and 300 nm or less. Owing to having such a size, a coating film having good appearance can be formed, and a coating film having better scratch resistance can be obtained. The average particle diameter can be measured by a known method. For example, it can be measured using a dynamic light scattering particle size distribution analyzer, a laser diffraction particle size distribution analyzer, or the like.

In the present disclosure, the particulate additive (E) may be added as desired. For example, when the coating composition of the present disclosure contains the particulate additive (E), the amount of the particulate additive (E) is 0.5 parts by mass or more and 10 parts by mass or less, preferably 0.5 parts by mass or more and 8 parts by mass or less, for example, 0.8 parts by mass or more and 7 parts by mass or less, per 100 parts by mass of the resin solid content of the coating composition according to the present disclosure.

Owing to the condition that the coating composition of the present disclosure contains the particulate additive (E) within such a range, a coating film having good appearance can be formed, and a coating film having better scratch resistance can be obtained.

[Other Components]

If necessary, an additive, such as a coloring pigment, an extender pigment, a modifier, a leveling agent, a dispersant, and a defoaming agent, may be blended in the coating composition according to the present disclosure as long as the design property of a base is not disturbed. In addition, a known curing catalyst may be contained as long as the characteristics of the components contained in the coating composition according to the present disclosure are not impaired.

Furthermore, it is preferable that a viscosity control agent is added to the coating composition in order to ensure coating workability. As the viscosity control agent, one that exhibits thixotropy can be commonly used. For example, a conventionally known material can be used as such an agent. In one embodiment, the viscosity control agent (rheology control agent) may contain at least one species of known microgels and non-aqueous dispersion type acrylic resins.

In one embodiment, the coating composition of the present invention can be used as a clear coating composition, and in this embodiment, the aforementioned other components may be contained as long as the properties required for a clear coating film, such as transparency of a resulting coating film, are not impaired.

The coating composition of the present disclosure can be used as, for example, a clear coating composition. For example, despite being a clear coating composition containing a melamine resin, it can have a good balance of the improvement in the appearance of a resulting clear coating film and the clear coating film properties such as scratch resistance and acid resistance. Therefore, the clear coating composition according to the present disclosure can be usefully used as a clear coating composition for automobile bodies.

[Method for Forming Multilayer Coating Film]

The method for forming a multilayer coating film of the present invention includes a step of forming a coating film by applying the coating composition according to the present disclosure to an object to be coated.

In one embodiment, a multilayer coating film can be formed by forming a base coating film on a substrate on which a primer coating film is formed, and further applying a coating composition according to the present invention to the base coating film.

(Object to be Coated)

In the method for forming a multilayer coating film of the present invention, the object to be coated may be one having a coating film formed by subjecting an electrically conductive substrate (e.g., an automobile body and its parts) to a degrease treatment or a chemical conversion treatment (e.g., a chemical conversion treatment with a phosphate or a zirconium salt), then applying a primer coating composition such as a known electrodeposition coating composition, and curing it.

(Method for Forming Primer Surfacer Film, Base Coating Film and Clear Coating Film)

The present disclosure further provides a method for forming a multilayer coating film. Specifically, the method for forming a multilayer coating film according to the present disclosure includes the step of applying a primer surfacer composition to an object to be coated to form a cured primer surfacer film or an uncured primer surfacer film, the step of applying a base coating composition to the primer surfacer film or the uncured primer surfacer film to form a cured base coating film or an uncured base coating film, and the step of applying the coating composition according to the present disclosure to the base coating film or the uncured base coating film to form a coating film.

The coating composition according to the present invention may be used as a clear coating composition.

In one embodiment, the method for forming a multilayer coating film of the present disclosure includes the step of applying a base coating composition to a substrate on which a primer coating film is formed (an object to be coated) to form a base coating film or an uncured base coating film, and the step of applying the coating composition according to the present disclosure to form a coating film.

In one embodiment, the present disclosure includes the primer surfacer film formation step of applying a primer surfacer composition to an object to be coated to form an uncured primer surfacer film, the base coating film formation step of applying a base coating composition to the resulting uncured primer surfacer film to form an uncured base coating film, and the step of applying the coating composition according to the present disclosure to the uncured base coating film to form a coating film.

In one embodiment, the method for forming a multilayer coating film of the present disclosure includes the step of applying a primer surfacer composition to a substrate on which a primer coating film is formed (an object to be coated) to form an uncured primer surfacer film, the step of applying a base coating composition to the uncured primer surfacer film to form an uncured base coating film, and the step of applying the coating composition according to the present disclosure to form a coating film.

As the primer surfacer composition, a coating composition usually used in the art, for example, an aqueous coating composition or a solvent type coating composition may be used.

In one embodiment, various coating films used in the art may be formed between the object to be coated and the primer surfacer film, between the primer surfacer film and the base coating film, and between the base coating film and the coating film formed from the coating composition according to the present disclosure.

As the base coating composition, a coating composition usually used in the art, for example, a metallic base coating composition or a color base coating composition may be used.

In one embodiment, various coating films used in the art may be formed between the object to be coated and the base coating film, and between the base coating film and the coating film formed from the coating composition according to the present disclosure. Moreover, two or more base coating films may be formed.

In addition, the base coating composition and the coating compositions for forming other coating films each may be either a solvent type coating composition or an aqueous coating composition.

For example, the coating film formation can be performed by a 2-coat 1-bake method in which clear coating compositions are sequentially applied wet-on-wet and then these coating films are cured simultaneously. Further, it can be applied also to a 2-coat 2-bake coating method in which the base coating composition is applied to a substrate on which a primer coating film is formed and is cured, and then a clear coating composition is applied and cured.

In one embodiment, the multilayer coating film formation can be performed by a 3-coat 2-bake method in which a base coating composition is applied to an object to be coated and is cured, then a glitter base coating composition and a coating composition according to the present invention, e.g., a clear coating composition, are applied wet-on-wet in this order, and subsequently these are cured simultaneously.

In another embodiment, a multilayer coating film can be formed by a 3-coat 1-bake coating method in which a base coating composition is applied to an object to be coated, then a glitter base coating composition is applied wet-on-wet, a coating composition according to the present invention, e.g., a clear coating composition, is applied, and the resulting three layers are cured simultaneously.

In yet another embodiment, a multilayer coating film can be formed by a 3-coat 1-bake coating method in which a primer surfacer composition is applied to an object to be coated, then a base coating composition is applied wet-on-wet, a coating composition according to the present invention, e.g., a clear coating composition, is applied, and the resulting three layers are cured simultaneously.

Furthermore, a multilayer coating film can be formed by a coating method in which a primer surfacer composition is applied to an object to be coated, then a base coating composition is applied wet-on-wet, then a glitter base coating composition is applied wet-on-wet, a coating composition according to the present invention, e.g., a clear coating composition, is applied wet-on-wet, and then the compositions are cured simultaneously.

In any embodiment, a substrate on which a primer coating film usually used in this field is formed may be used as an object to be coated.

For example, when it is applied to an automobile body or the like, the method of applying the base coating composition is preferably a method in which it is applied by multistage coating, preferably two stage application by use of air electrostatic spray coating in order to improve the design property, or alternatively, an application method combining air electrostatic spray and a rotary atomization type electrostatic applicator, which is so-called "μμ (micro micro) bell", "μ (micro) bell", or "metallic bell".

The dry film thickness of the primer surfacer film formed by the application of the primer surfacer composition varies depending on the desired use, but in many cases, the lower limit thereof is preferably 10 μm and the upper limit thereof is 50 μm. By setting the dry film thickness of the primer surfacer film within the above range, the generation of film breakage due to failure in hiding the base is suppressed, and the generation of problems such as flow is prevented during application.

In one embodiment, after the primer surfacer composition is applied, the process proceeds to, for example, the step of applying the base coating composition without heat-curing the primer surfacer composition. In this case, before applying a coating composition, for example, a base coating composition, a preheating step of heating the composition at a temperature lower than the temperature used in a heat curing (baking) treatment, for example, at 40 to 100° C., for 1 to 10 minutes to volatilize solvents, such as water may be carried out if necessary.

The dry film thickness of the base coating film formed by application of the base coating composition varies depending on the desired application, but in many cases, the lower limit and the upper limit thereof are preferably 5 μm and 30 μm, respectively. By setting the dry film thickness of the base coating film within the above range, the generation of film breakage due to failure in hiding the base is suppressed, and the generation of problems such as flow is prevented during application.

In one embodiment, after the base coating composition is applied, the process proceeds to the step of applying the coating composition of the present invention, e.g., a clear coating composition, without heat-curing the base coating composition. In this case, before applying a coating composition, for example, a clear coating composition, a preheating step of heating the composition at a temperature lower than the temperature used in a heat curing (baking) treatment, for example, at 40 to 100° C., for 1 to 10 minutes to volatilize solvents, such as water may be carried out if necessary.

In general, the dry film thickness of a coating film to be formed from the coating composition of the present disclosure, for example, a clear coating film, preferably has a lower limit of 20 μm and an upper limit of 70 μm. If it is less than 20 μm, there is a possibility that the irregularities of the base are insufficiently hidden. If it exceeds 70 μm, there is a possibility that problems such as popping or sagging occur during application. The lower limit of the dry film thickness is more preferably 25 μm, and the upper limit of the dry film thickness is more preferably 60 μm.

For example, after the application of a primer surfacer composition, a base coating composition, and a clear coating composition, these uncured coating films are cured. The curing temperature preferably has a lower limit of 100° C. and an upper limit of 180° C. When it is lower than 100° C., the degree of curing may be insufficient. When it exceeds 180° C., the coating film may be hard and brittle. The lower limit is more preferably 120° C. and the upper limit is more preferably 160° C. in that a cured coating film having a high degree of crosslinking can be obtained. Although the curing time varies depending on the curing temperature, it is preferably 10 to 30 minutes at 120 to 160° C.

EXAMPLES

The present invention will be described more specifically with reference to the following examples, but the present invention is not limited to the examples. In the examples, "parts" and "%" are on a mass basis unless otherwise indicated.

Production Example A1 Production of Hydroxyl Group-Containing Acrylic Resin (A1)

A 3-liter four-necked flask equipped with a stirrer, a thermometer, a condenser, and a nitrogen gas inlet was charged with 600 parts of "normal butyl acetate", and the temperature was raised to 125° C. under nitrogen gas flow. After reaching 125° C., the nitrogen gas flow was stopped, and the following monomer mixture 1 having a composition containing a monomer, a solvent, and a polymerization initiator (p-tert-butyl peroxy-2-ethylhexanoate) was dripped over 3 hours.

Subsequently, after aging for 30 minutes while passing nitrogen gas at 125° C., a mixture of 10 parts of p-tert-butyl peroxy-2-ethylhexanoate and 30 parts of "normal butyl acetate" was further dropped over 1 hour. Then, the mixture was cooled to obtain a solution (solid content: 60.1% by mass) of a hydroxyl group-containing resin (A1). The hydroxyl group-containing resin (A1) had a number-average molecular weight (Mn) of about 2,000, a solid hydroxyl value of 170 mgKOH/g, and a glass transition temperature (Tg) of 20° C.

TABLE 1A

| Monomer mixture 1 | |
|---|---|
| Styrene | 200 parts |
| 2-Ethylhexyl acrylate | 132 parts |
| 2-Ethylhexyl methacrylate | 263.6 parts |
| Hydroxyethyl methacrylate | 394.4 parts |
| Methacrylic acid | 10 parts |
| p-tert-Butyl peroxy-2-ethylhexanoate | 180 parts |

Production Example A1-2 Production of Hydroxyl Group-Containing Acrylic Resin (A1-2)

A 3-liter four-necked flask equipped with a stirrer, a thermometer, a condenser, and a nitrogen gas inlet was charged with 600 parts of "normal butyl acetate", and the temperature was raised to 125° C. under nitrogen gas flow. After reaching 125° C., the nitrogen gas flow was stopped, and the following monomer mixture 1-2 having a composition containing a monomer, a solvent, and a polymerization initiator (p-tert-butyl peroxy-2-ethylhexanoate) was dripped over 3 hours.

Subsequently, after aging for 30 minutes while passing nitrogen gas at 125° C., a mixture of 10 parts of p-tert-butyl peroxy-2-ethylhexanoate and 30 parts of "normal butyl acetate" was further dropped over 1 hour. Then, the mixture was cooled to obtain a solution (solid content: 60.1% by mass) of a hydroxyl group-containing resin (A1-2). The hydroxyl group-containing resin (A1-2) had a number-average molecular weight (Mn) of about 4,000, a solid hydroxyl value of 175 mgKOH/g, and a glass transition temperature (Tg) of 10° C.

TABLE 1B

| Monomer mixture 1-2 | |
|---|---|
| Styrene | 200 parts |
| 2-Ethylhexyl acrylate | 247 parts |
| 2-Ethylhexyl methacrylate | 137 parts |
| Hydroxyethyl methacrylate | 406 parts |
| Methacrylic acid | 10 parts |
| p-tert-Butyl peroxy-2-ethylhexanoate | 100 parts |

Production Example A2 Production of Hydroxyl Group-Containing Acrylic Resin (A2)

A 3-liter four-necked flask equipped with a stirrer, a thermometer, a condenser, and a nitrogen gas inlet was charged with 600 parts of "normal butyl acetate", and the temperature was raised to 125° C. under nitrogen gas flow. After reaching 125° C., the nitrogen gas flow was stopped, and the following monomer mixture 2 having a composition containing a monomer, a solvent, and a polymerization initiator (p-tert-butyl peroxy-2-ethylhexanoate) was dripped over 3 hours.

Subsequently, after aging for 30 minutes while passing nitrogen gas at 125° C., a mixture of 10 parts of p-tert-butyl peroxy-2-ethylhexanoate and 30 parts of "normal butyl acetate" was further dropped over 1 hour. Then, the mixture was cooled to obtain a solution (solid content: 60.6% by mass) of a hydroxyl group-containing resin (A2). The hydroxyl group-containing resin (A2) had a number-average molecular weight of about 4,000, a solid hydroxyl value of 200 mgKOH/g, and a glass transition temperature (Tg) of 0° C.

TABLE 2A

| Monomer mixture 2 | |
| --- | --- |
| Styrene | 200 parts |
| 2-Ethylhexyl acrylate | 328 parts |
| 2-Ethylhexyl methacrylate | 5 parts |
| Hydroxyethyl methacrylate | 464 parts |
| Methacrylic acid | 3 parts |
| p-tert-Butyl peroxy-2-ethylhexanoate | 100 parts |

Production Example A2-2 Production of Hydroxyl Group-Containing Acrylic Resin (A2-2)

A 3-liter four-necked flask equipped with a stirrer, a thermometer, a condenser, and a nitrogen gas inlet was charged with 600 parts of "normal butyl acetate", and the temperature was raised to 125° C. under nitrogen gas flow. After reaching 125° C., the nitrogen gas flow was stopped, and the following monomer mixture 2-2 having a composition containing a monomer, a solvent, and a polymerization initiator (p-tert-butyl peroxy-2-ethylhexanoate) was dripped over 3 hours.

Subsequently, after aging for 30 minutes while passing nitrogen gas at 125° C., a mixture of 10 parts of p-tert-butyl peroxy-2-ethylhexanoate and 30 parts of "normal butyl acetate" was further dropped over 1 hour. Then, the mixture was cooled to obtain a solution (solid content: 60.6% by mass) of a hydroxyl group-containing resin (A2-2). The hydroxyl group-containing resin (A2-2) had a number-average molecular weight of about 4,000, a solid hydroxyl value of 140 mgKOH/g, and a glass transition temperature (Tg) of 10° C.

TABLE 2B

| Monomer mixture 2-2 | |
| --- | --- |
| Styrene | 200 parts |
| 2-Ethylhexyl acrylate | 267 parts |
| n-Butyl methacrylate | 193 parts |
| Hydroxyethyl methacrylate | 325 parts |
| Methacrylic acid | 15 parts |
| p-tert-Butyl peroxy-2-ethylhexanoate | 100 parts |

Production Example A3 Production of Hydroxyl Group-Containing Acrylic Resin (A3)

A 3-liter four-necked flask equipped with a stirrer, a thermometer, a condenser, and a nitrogen gas inlet was charged with 600 parts of "normal butyl acetate", and the temperature was raised to 125° C. under nitrogen gas flow. After reaching 125° C., the nitrogen gas flow was stopped, and the following monomer mixture 3 having a composition containing a monomer, a solvent, and a polymerization initiator (p-tert-butyl peroxy-2-ethylhexanoate) was dripped over 3 hours.

Subsequently, after aging for 30 minutes while passing nitrogen gas at 125° C., a mixture of 10 parts of p-tert-butyl peroxy-2-ethylhexanoate and 30 parts of "normal butyl acetate" was further dropped over 1 hour. Then, the mixture was cooled to obtain a solution (solid content: 60.7% by mass) of a hydroxyl group-containing resin (A3). The hydroxyl group-containing resin (A3) had a number-average molecular weight of about 6,000, a solid hydroxyl value of 60 mgKOH/g, and a glass transition temperature (Tg) of 20° C.

TABLE 3

| Monomer mixture 3 | |
| --- | --- |
| Styrene | 200 parts |
| 2-Ethylhexyl acrylate | 10 parts |
| 2-Ethylhexyl methacrylate | 640.8 parts |
| Hydroxyethyl methacrylate | 139.2 parts |
| Methacrylic acid | 10 parts |
| p-tert-Butyl peroxy-2-ethylhexanoate | 75 parts |

Production Example A3-2 Production of Hydroxyl Group-Containing Acrylic Resin (A3-2)

A 3-liter four-necked flask equipped with a stirrer, a thermometer, a condenser, and a nitrogen gas inlet was charged with 600 parts of "normal butyl acetate", and the temperature was raised to 125° C. under nitrogen gas flow. After reaching 125° C., the nitrogen gas flow was stopped, and the following monomer mixture 3-2 having a composition containing a monomer, a solvent, and a polymerization initiator (p-tert-butyl peroxy-2-ethylhexanoate) was dripped over 3 hours.

Subsequently, after aging for 30 minutes while passing nitrogen gas at 125° C., a mixture of 10 parts of p-tert-butyl peroxy-2-ethylhexanoate and 30 parts of "normal butyl acetate" was further dropped over 1 hour. Then, the mixture was cooled to obtain a solution (solid content: 60.7% by mass) of a hydroxyl group-containing resin (A3-2). The hydroxyl group-containing resin (A3-2) had a number-average molecular weight of about 6,000, a solid hydroxyl value of 50 mgKOH/g, and a glass transition temperature (Tg) of 20° C.

TABLE 3B

| Monomer mixture 3-2 | |
| --- | --- |
| Styrene | 100 parts |
| 2-Ethylhexyl acrylate | 260 parts |
| 2-Ethylhexyl methacrylate | 493 parts |
| Hydroxyethyl methacrylate | 116 parts |
| Methacrylic acid | 31 parts |
| p-tert-Butyl peroxy-2-ethylhexanoate | 75 parts |

Melamine Resin (B1-1)

As the melamine resin (B1-1), an imino type melamine resin (CYMEL 254 manufactured by Allnex) was used.

Melamine Resin (B1-2)

As the melamine resin (B1-2), a full alkyl type melamine resin (CYMEL 303 manufactured by Allnex) was used.

Unblocked Isocyanate Compound (B2-1)

As the unblocked isocyanate compound (B2-1), Sumidur N3300 (manufactured by Sumika Covestro Urethane Co., Ltd.), a nurate body of hexamethylene diisocyanate having an NCO content of 21.8% and a solid content of 100%, was used.

Production Example C1 Production of Half-Ester Group-Containing Copolymer (C1)

A 3-liter four-necked flask equipped with a stirrer, a thermometer, a condenser, and a nitrogen gas inlet was charged with 800 parts of "SOLVESSO 100J", and the temperature was raised to 125° C. under nitrogen gas flow. After reaching 125° C., the nitrogen gas flow was stopped, and the following monomer mixture 1 having a composition containing a monomer, a solvent, and a polymerization initiator (p-tert-butyl peroxy-2-ethylhexanoate) was dripped over 4 hours.

Subsequently, after aging for 30 minutes while passing nitrogen gas at 125° C., a mixture of 10 parts of p-tert-butyl peroxy-2-ethylhexanoate and 118 parts of "SOLVESSO 100J" was further dropped over 1 hour. After cooling to 100° C. and feeding 320.9 parts of normal butanol, the mixture was kept at 100° C. for 12 hours with stirring. Then, the mixture was cooled to obtain a solution (solid content: 51.5% by mass) of a half-ester group-containing copolymer (C1). The half-ester group-containing copolymer (C1) had a number-average molecular weight of about 2,800 and a solid acid value of 140 mgKOH/g.

TABLE 4

| Monomer mixture 1 | |
|---|---|
| Styrene | 245.2 parts |
| iso-Butyl acrylate | 149.5 parts |
| 2-Ethylhexyl acrylate | 139.4 parts |
| Isobornyl acrylate | 23 parts |
| Cyclohexyl methacrylate | 207.5 parts |
| Acrylic acid | 25.7 parts |
| Maleic anhydride | 209.7 parts |
| p-tert-Butyl peroxy-2-ethylhexanoate | 72.5 parts |

Production Example C2 Production of Half-Ester Group-Containing Copolymer (C2)

A 3-liter four-necked flask equipped with a stirrer, a thermometer, a condenser, and a nitrogen gas inlet was charged with 800 parts of "SOLVESSO 100J", and the temperature was raised to 125° C. under nitrogen gas flow. After reaching 125° C., the nitrogen gas flow was stopped, and the following monomer mixture 2 having a composition containing a monomer, a solvent, and a polymerization initiator (p-tert-butyl peroxy-2-ethylhexanoate) was dripped over 4 hours.

Subsequently, after aging for 30 minutes while passing nitrogen gas at 125° C., a mixture of 1 part of p-tert-butyl peroxy-2-ethylhexanoate and 118 parts of "SOLVESSO 100J" was further dropped over 1 hour. After cooling to 100° C. and feeding 15.9 parts of normal butanol, the mixture was kept at 100° C. for 12 hours with stirring. Then, the mixture was cooled to obtain a solution (solid content: 52.1% by mass) of a half-ester group-containing copolymer (C2). The half-ester group-containing copolymer (C2) had a number-average molecular weight of about 10,000 and a solid acid value of 6 mgKOH/g.

TABLE 5

| Monomer mixture 2 | |
|---|---|
| Styrene | 11.1 parts |
| iso-Butyl acrylate | 249.5 parts |
| 2-Ethylhexyl acrylate | 264.3 parts |
| Isobornyl acrylate | 157.1 parts |
| Cyclohexyl methacrylate | 307.5 parts |
| Acrylic acid | 0 parts |
| Maleic anhydride | 10.5 parts |
| p-tert-Butyl peroxy-2-ethylhexanoate | 5 parts |

Production Example C3 Production of Half-Ester Group-Containing Copolymer (C3)

A 3-liter four-necked flask equipped with a stirrer, a thermometer, a condenser, and a nitrogen gas inlet was charged with 800 parts of "SOLVESSO 100J", and the temperature was raised to 125° C. under nitrogen gas flow. After reaching 125° C., the nitrogen gas flow was stopped, and the following monomer mixture 3 having a composition containing a monomer, a solvent, and a polymerization initiator (p-tert-butyl peroxy-2-ethylhexanoate) was dripped over 4 hours.

Subsequently, after aging for 30 minutes while passing nitrogen gas at 125° C., a mixture of 1 part of p-tert-butyl peroxy-2-ethylhexanoate and 118 parts of "SOLVESSO 100J" was further dropped over 1 hour. After cooling to 100° C. and feeding 26.4 parts of normal butanol, the mixture was kept at 100° C. for 12 hours with stirring. Then, the mixture was cooled to obtain a solution (solid content: 52.1% by mass) of a half-ester group-containing copolymer (C3). The half-ester group-containing copolymer (C3) had a number-average molecular weight of about 10,000 and a solid acid value of 10 mgKOH/g.

TABLE 6

| Monomer mixture 3 | |
|---|---|
| Styrene | 18.6 parts |
| iso-Butyl acrylate | 235 parts |
| 2-Ethylhexyl acrylate | 264.3 parts |
| Isobornyl acrylate | 157.1 parts |
| Cyclohexyl methacrylate | 307.5 parts |
| Acrylic acid | 0 parts |
| Maleic anhydride | 17.5 parts |
| p-tert-Butyl peroxy-2-ethylhexanoate | 5 parts |

Production Example C4 Production of Half-Ester Group-Containing Copolymer (C4)

A 3-liter four-necked flask equipped with a stirrer, a thermometer, a condenser, and a nitrogen gas inlet was charged with 800 parts of "SOLVESSO 100J", and the temperature was raised to 125° C. under nitrogen gas flow. After reaching 125° C., the nitrogen gas flow was stopped, and the following monomer mixture 4 having a composition containing a monomer, a solvent, and a polymerization initiator (p-tert-butyl peroxy-2-ethylhexanoate) was dripped over 4 hours.

Subsequently, after aging for 30 minutes while passing nitrogen gas at 125° C., a mixture of 10 parts of p-tert-butyl peroxy-2-ethylhexanoate and 118 parts of "SOLVESSO 100J" was further dropped over 1 hour. After cooling to 100° C. and feeding 366.4 parts of normal butanol, the mixture was kept at 100° C. for 12 hours with stirring. Then, the mixture was cooled to obtain a solution (solid content: 54.1% by mass) of a half-ester group-containing copolymer (C4). The half-ester group-containing copolymer (C4) had a number-average molecular weight of about 1,000 and a solid acid value of 236 mgKOH/g.

TABLE 7

| Monomer mixture 4 | |
| --- | --- |
| Styrene | 515.1 parts |
| iso-Butyl acrylate | 0 parts |
| 2-Ethylhexyl acrylate | 0 parts |
| Isobornyl acrylate | 0 parts |
| Cyclohexyl methacrylate | 0 parts |
| Acrylic acid | 0 parts |
| Maleic anhydride | 484.9 parts |
| p-tert-Butyl peroxy-2-ethylhexanoate | 180 parts |

Production Example C5 Production of Half-Ester Group-Containing Copolymer (C5)

A 3-liter four-necked flask equipped with a stirrer, a thermometer, a condenser, and a nitrogen gas inlet was charged with 800 parts of "SOLVESSO 100J", and the temperature was raised to 125° C. under nitrogen gas flow. After reaching 125° C., the nitrogen gas flow was stopped, and the following monomer mixture 5 having a composition containing a monomer, a solvent, and a polymerization initiator (p-tert-butyl peroxy-2-ethylhexanoate) was dripped over 4 hours.

Subsequently, after aging for 30 minutes while passing nitrogen gas at 125° C., a mixture of 10 parts of p-tert-butyl peroxy-2-ethylhexanoate and 118 parts of "SOLVESSO 100J" was further dropped over 1 hour. After cooling to 100° C. and feeding 138.8 parts of normal methanol, the mixture was kept at 60° C. for 18 hours with stirring. Then, the mixture was cooled to obtain a solution (solid content: 51.9% by mass) of a half-ester group-containing copolymer (C5). The half-ester group-containing copolymer (C5) had a number-average molecular weight of about 2,800 and a solid acid value of 140 mgKOH/g.

TABLE 8

| Monomer mixture 5 | |
| --- | --- |
| Styrene | 245.2 parts |
| iso-Butyl acrylate | 149.5 parts |
| 2-Ethylhexyl acrylate | 139.4 parts |
| Isobornyl acrylate | 23 parts |
| Cyclohexyl methacrylate | 207.5 parts |
| Acrylic acid | 25.7 parts |
| Maleic anhydride | 209.7 parts |
| p-tert-Butyl peroxy-2-ethylhexanoate | 72.5 parts |

Production Example C6 Production of Half-Ester Group-Containing Copolymer (C6)

A 3-liter four-necked flask equipped with a stirrer, a thermometer, a condenser, and a nitrogen gas inlet was charged with 800 parts of "SOLVESSO 100J", and the temperature was raised to 125° C. under nitrogen gas flow. After reaching 125° C., the nitrogen gas flow was stopped, and the following monomer mixture 6 having a composition containing a monomer, a solvent, and a polymerization initiator (p-tert-butyl peroxy-2-ethylhexanoate) was dripped over 4 hours.

Subsequently, after aging for 30 minutes while passing nitrogen gas at 125° C., a mixture of 10 parts of p-tert-butyl peroxy-2-ethylhexanoate and 118 parts of "SOLVESSO 100J" was further dropped over 1 hour. Subsequently, after feeding 557 parts of normal octanol, the mixture was kept at 125° C. for 18 hours with stirring. Then, the mixture was cooled to obtain a solution (solid content: 51.6% by mass) of a half-ester group-containing copolymer (C6). The half-ester group-containing copolymer (C6) had a number-average molecular weight of about 2,800 and a solid acid value of 140 mgKOH/g.

TABLE 9

| Monomer mixture 6 | |
| --- | --- |
| Styrene | 245.2 parts |
| iso-Butyl acrylate | 149.5 parts |
| 2-Ethylhexyl acrylate | 139.4 parts |
| Isobornyl acrylate | 23 parts |
| Cyclohexyl methacrylate | 207.5 parts |
| Acrylic acid | 25.7 parts |
| Maleic anhydride | 209.7 parts |
| p-tert-Butyl peroxy-2-ethylhexanoate | 72.5 parts |

Production Example C7 Production of Half-Ester Group-Containing Copolymer (C7)

A 3-liter four-necked flask equipped with a stirrer, a thermometer, a condenser, and a nitrogen gas inlet was charged with 800 parts of "SOLVESSO 100J", and the temperature was raised to 125° C. under nitrogen gas flow. After reaching 125° C., the nitrogen gas flow was stopped, and the following monomer mixture 7 having a composition containing a monomer, a solvent, and a polymerization initiator (p-tert-butyl peroxy-2-ethylhexanoate) was dripped over 4 hours.

Subsequently, after aging for 30 minutes while passing nitrogen gas at 125° C., a mixture of 1 part of p-tert-butyl peroxy-2-ethylhexanoate and 118 parts of "SOLVESSO 100J" was further dropped over 1 hour. After cooling to 100° C. and feeding 8 parts of normal butanol, the mixture was kept at 100° C. for 12 hours with stirring. Then, the mixture was cooled to obtain a solution (solid content: 52.1% by mass) of a half-ester group-containing copolymer (C7). The half-ester group-containing copolymer (C7) had a number-average molecular weight of about 10,000 and a solid acid value of 3 mgKOH/g.

TABLE 10

| Monomer mixture 7 | |
| --- | --- |
| Styrene | 5.6 parts |
| iso-Butyl acrylate | 249.5 parts |
| 2-Ethylhexyl acrylate | 270 parts |
| Isobornyl acrylate | 162.1 parts |
| Cyclohexyl methacrylate | 307.5 parts |
| Acrylic acid | 0 parts |
| Maleic anhydride | 5.3 parts |
| p-tert-Butyl peroxy-2-ethylhexanoate | 5 parts |

Production Example C8 Production of Half-Ester Group-Containing Copolymer (C8)

A 3-liter four-necked flask equipped with a stirrer, a thermometer, a condenser, and a nitrogen gas inlet was charged with 800 parts of "SOLVESSO 100J", and the temperature was raised to 125° C. under nitrogen gas flow. After reaching 125° C., the nitrogen gas flow was stopped, and the following monomer mixture 8 having a composition containing a monomer, a solvent, and a polymerization initiator (p-tert-butyl peroxy-2-ethylhexanoate) was dripped over 4 hours.

Subsequently, after aging for 30 minutes while passing nitrogen gas at 125° C., a mixture of 10 parts of p-tert-butyl peroxy-2-ethylhexanoate and 118 parts of "SOLVESSO 100J" was further dropped over 1 hour. Subsequently, after feeding 797 parts of normal dodecanol, the mixture was kept at 125° C. for 18 hours with stirring. Then, the mixture was cooled to obtain a solution (solid content: 51.5% by mass) of a half-ester group-containing copolymer (C8). The half-ester group-containing copolymer (C8) had a number-average molecular weight of about 2,800 and a solid acid value of 140 mgKOH/g.

TABLE 11

| Monomer mixture 8 | |
|---|---|
| Styrene | 245.2 parts |
| iso-Butyl acrylate | 149.5 parts |
| 2-Ethylhexyl acrylate | 139.4 parts |
| Isobornyl acrylate | 23 parts |
| Cyclohexyl methacrylate | 207.5 parts |
| Acrylic acid | 25.7 parts |
| Maleic anhydride | 209.7 parts |
| p-tert-Butyl peroxy-2-ethylhexanoate | 72.5 parts |

Production Example C9 Production of Copolymer (C9) Containing No Half-Ester Group A 3-liter four-necked flask equipped with a stirrer, a thermometer, a condenser, and a nitrogen gas inlet was charged with 800 parts of "SOLVESSO 100J", and the temperature was raised to 125° C. under nitrogen gas flow. After reaching 125° C., the nitrogen gas flow was stopped, and the following monomer mixture 9 having a composition containing a monomer, a solvent, and a polymerization initiator (p-tert-butyl peroxy-2-ethylhexanoate) was dripped over 4 hours.

Subsequently, after aging for 30 minutes while passing nitrogen gas at 125° C., a mixture of 10 parts of p-tert-butyl peroxy-2-ethylhexanoate and 118 parts of "SOLVESSO 100J" was further dropped over 1 hour. Then, the mixture was cooled to obtain a solution (solid content: 52.1% by mass) of a copolymer (C9) containing no half-ester group. The copolymer (C9) containing no half-ester group had a number-average molecular weight of about 2,800 and a solid acid value of 20 mgKOH/g.

TABLE 12

| Monomer mixture 9 | |
|---|---|
| Styrene | 245.2 parts |
| iso-Butyl acrylate | 149.5 parts |
| 2-Ethylhexyl acrylate | 139.4 parts |
| Isobornyl acrylate | 23 parts |
| Cyclohexyl methacrylate | 207.5 parts |
| Acrylic acid | 25.7 parts |
| Maleic anhydride | 209.7 parts |
| p-tert-Butyl peroxy-2-ethylhexanoate | 72.5 parts |

Production Example C10 Production of Copolymer (C10)

A 3-liter four-necked flask equipped with a stirrer, a thermometer, a condenser, and a nitrogen gas inlet was charged with 800 parts of "SOLVESSO 100J", and the temperature was raised to 125° C. under nitrogen gas flow. After reaching 125° C., the nitrogen gas flow was stopped, and the following monomer mixture 10 having a composition containing a monomer, a solvent, and a polymerization initiator (p-tert-butyl peroxy-2-ethylhexanoate) was dripped over 4 hours.

Subsequently, after aging for 30 minutes while passing nitrogen gas at 125° C., a mixture of 10 parts of p-tert-butyl peroxy-2-ethylhexanoate and 118 parts of "SOLVESSO 100J" was further dropped over 1 hour. Subsequently, after feeding 505.4 parts of 1,6-hexanediol, the mixture was kept at 100° C. for 12 hours with stirring. Since gelation occurred during the keeping temperature, a copolymer (C10) failed to be obtained.

TABLE 13

| Monomer mixture 10 | |
|---|---|
| Styrene | 245.2 parts |
| iso-Butyl acrylate | 149.5 parts |
| 2-Ethylhexyl acrylate | 139.4 parts |
| Isobornyl acrylate | 23 parts |
| Cyclohexyl methacrylate | 207.5 parts |
| Acrylic acid | 25.7 parts |
| Maleic anhydride | 209.7 parts |
| p-tert-Butyl peroxy-2-ethylhexanoate | 72.5 parts |

Production Example C11 Production of Half-Ester Group-Containing Copolymer (C11)

A 3-liter four-necked flask equipped with a stirrer, a thermometer, a condenser, and a nitrogen gas inlet was charged with 800 parts of "SOLVESSO 100J", and the temperature was raised to 125° C. under nitrogen gas flow. After reaching 125° C., the nitrogen gas flow was stopped, and the following monomer mixture 11 having a composition containing a monomer, a solvent, and a polymerization initiator (p-tert-butyl peroxy-2-ethylhexanoate) was dripped over 4 hours.

Subsequently, after aging for 30 minutes while passing nitrogen gas at 125° C., a mixture of 10 parts of p-tert-butyl peroxy-2-ethylhexanoate and 118 parts of "SOLVESSO 100J" was further dropped over 1 hour. After cooling to 100° C. and feeding 105.5 parts of normal butanol, the mixture was kept at 100° C. for 12 hours with stirring. Then, the mixture was cooled to obtain a solution (solid content: 52.7% by mass) of a half-ester group-containing copolymer (C11). The half-ester group-containing copolymer (C11) had a number-average molecular weight of about 2,800 and a solid acid value of 50 mgKOH/g.

TABLE 14

| Monomer mixture 11 | |
|---|---|
| Styrene | 84.8 parts |
| iso-Butyl acrylate | 239.6 parts |
| 2-Ethylhexyl acrylate | 223.4 parts |
| Isobornyl acrylate | 36.9 parts |
| Cyclohexyl methacrylate | 332.5 parts |
| Acrylic acid | 12.9 parts |

TABLE 14-continued

| Monomer mixture 11 | |
| --- | --- |
| Maleic anhydride | 69.9 parts |
| p-tert-Butyl peroxy 2-ethylhexanoate | 72.5 parts |

Organic-Inorganic Hybrid Polymer Dispersion (E1)

An organic-inorganic hybrid polymer dispersion (E1) was prepared according to the following method.

8 parts of methyl methoxy silicone oligomer KR-500 (manufactured by Shin-Etsu Chemical Co., Ltd.) as a silicone oligomer, 15.0 parts of dimethyldimethoxysilane, 20 parts of methyltrimethoxysilane, 36 parts of phenyltrimethoxysilane and 1 part of γ-methacryloxypropyltrimethoxysilane as hydrolyzable silane compounds, and 2.0 parts of methyl methacrylate, 3.6 parts of styrene, and 4.4 parts of 2-ethylhexyl acrylate as radically polymerizable unsaturated monomers were stirred and mixed, and then 17 parts of polyoxyalkylene alkene ether ammonium sulfate (LATEMUL PD-104, manufactured by Kao Corporation) as an emulsifier and 36 parts of water were added and stirred at room temperature for 15 minutes using a homomixer to obtain 142 parts of a pre-reaction emulsion mixture (pre-reaction emulsion mixture preparation step).

The average particle diameter of the obtained pre-reaction emulsion mixture was 625 nm.

Subsequently, a reaction vessel equipped with a stirrer, a reflux condenser, dropping tanks and a thermometer was charged with 57 parts of water and 3 parts of polyoxyalkylene alkene ether ammonium sulfate (LATEMUL PD-104, manufactured by Kao Corporation) and the amount given in the table of 25% aqueous ammonia was added to adjust the pH to 11.0 (first pH adjustment step).

The temperature of the reaction vessel containing the pH-adjusted water obtained in the first pH adjustment step was raised to 80° C., and then 160 parts of the pre-reaction emulsion mixture and 6.5 parts of 2.5% aqueous solution of ammonium persulfate were added from separate dropping layers simultaneously over 2 hours. After the completion of the dropping, the temperature in the reaction vessel was maintained at 80° C. for 1 hour.

Subsequently, 25% aqueous ammonia was added to adjust the pH of the reaction field to 9.75, and then the temperature was raised to 84° C. to advance a condensation reaction over 5 hours.

Furthermore, the obtained emulsion aqueous solution was cooled to 40° C., 14 parts of water was added, and the by-product methanol was distilled off under reduced pressure.

Further, after stirring and mixing 2.0 parts of methyl methacrylate, 3.6 parts of styrene, and 4.4 parts of 2-ethylhexyl acrylate, 1.9 parts of polyoxyalkylene alkene ether ammonium sulfate (LATEMUL PD-104, manufactured by Kao Corporation) as an emulsifier and 4.1 parts of water were added and stirred at room temperature for 15 minutes using a homomixer to obtain a second pre-reaction emulsion mixture.

After adjusting the temperature to 80° C., 16 parts of the second pre-reaction emulsion mixture and 2.7 parts of 1.5% aqueous solution of ammonium persulfate were dropped simultaneously from separate dropping funnels over 2 hours. After the completion of the dropping, the temperature in the reaction vessel was maintained at 80° C. for 1 hour and then cooled to 30° C. to obtain 198.4 parts of a core-shell type acrylic silicone resin emulsion. The obtained emulsion had a solid content of 39.3% and an average particle diameter of 160 nm.

A reaction vessel equipped with a stirrer and a thermometer was charged with 198.4 parts of the resulting emulsion and 600 parts of butyl acetate. Under reduced pressure, 404.6 parts of a mixed solution of water and butyl acetate was distilled off. The resulting particle dispersion had a water content of 220 ppm and a solid content of 19.8%.

Inorganic Particles (E2)

AEROSIL R805 manufactured by Aerosil was used as the inorganic particles (E2).

Organic Resin-Coated Inorganic Particles (E3)

NANOBYK-3652 manufactured by BYK was used as the organic resin-coated inorganic particles (E3).

Examples 1 to 19 and Comparative Examples 1 to 6

Examples and Comparative Examples Containing Melamine Resin (B1)

Clear coating compositions of Examples 1 to 19 and Comparative Examples 1 to 6 were prepared by mixing components in accordance with the formulations shown in Table 15 and then stirring them with a disper. The clear coating compositions were each diluted with a thinner composed of n-butyl acetate/ethyl 3-ethoxypropionate=1/2 (mass ratio) in a No. 4 Ford cup such that 30 seconds/20° C. was achieved.

(Formation of Multilayer Coating Film)

Next, AR-2000 Silver Metallic (aqueous base coating manufactured by Nippon Paint Co., Ltd.) was air-sprayed to achieve a dry film thickness of 15 μm onto a test plate prepared by applying Power Top U-50 (a cationic electrodeposition coating manufactured by Nippon Paint Co., Ltd.) and Olga P-2 (a primer surfacer manufactured by Nippon Paint Co., Ltd.) to achieve a dry film thickness of 25 μm and 40 μm, respectively, onto a dull steel plate treated with zinc phosphate and measuring 150 mm wide by 300 mm long by 0.8 mm thick, and these were dried at 80° C. for 5 minutes. Thus, an uncured base coating film was formed. On the top of that, a viscosity-adjusted clear coating composition was air-sprayed to achieve a dry film thickness of 40 μm, thereby forming an uncured clear coating film, followed by setting for 7 minutes. Then, it was baked and cured at 140° C. for 25 minutes, and thus a multilayer coating film was formed.

Each of the obtained coating films for testing was evaluated as described below.

Comparative Example 7

In Comparative Example 7, an attempt was made to mix components in accordance with the formulation shown in Table 16. However, since gelation occurred during the preparation of the copolymer (C10) as described above, a clear coating composition was not able to be prepared.

As the evaluation of the appearance and the design property of coating films, smoothness, sharpness, brightness, acid resistance, scratch resistance, and pencil hardness were evaluated. The results obtained are shown in Tables 15 and 16.

(Smoothness)

Smoothness was evaluated according to the following criteria using CF, which is an evaluative value for the smoothness of a coating film, chosen among the values obtained by using a wave-scan II (a surface roughness analyzer manufactured by BYK-Chemie GmbH). (Evaluation of smoothness)

⊙ (Very good): The value of CF is 60 or more.
○ (Good): The value of CF is 55 or more and less than 60.
Δ (Slightly poor): The value of CF is 50 or more and less than 55.
x (Poor): The value of CF is less than 50.

(Sharpness)

The sharpness of a resulting coating film was evaluated according to the following criteria using DOI, which is an evaluative value for the sharpness of a coating film, chosen from among the values obtained by using a wave-scan II (a surface roughness analyzer manufactured by BYK-Chemie GmbH).

(Evaluation of Sharpness)

⊙ (Very good): The value of DOI exceeded 80.
○ (Good): The value of DOI was more than 75 and 80 or less.
Δ (Slightly poor): The value of DOI was more than 70 and 75 or less.
x (Poor): The value of DOI was 70 or less.

(Brightness)

In the evaluation of the sharpness of a resulting coating film, brightness was evaluated according to the following criteria using a value (L25-L75), as an evaluative value for brightness, which was determined by subtracting an L value at 750 (L75) from an L value at 250 (L25) chosen from among the values obtained by using CM512M3 (a multi-angle colorimeter manufactured by KONICA MINOLTA, INC.).

⊙ (Brightness is very strong): The value of L25-L75 exceeded 47.5.
○ (Brightness is strong): The value of L25-L75 was more than 45 and 47.5 or less.
Δ (Slight brightness is recognized): The value of L25-L75 was more than 42.5 and 45 or less.
x (Brightness is weak): The value of L25-L75 was 42.5 or less.

(Acid Resistance)

In the evaluation of the acid resistance of the resulting coating film, 50 μl of a 1% by mass sulfuric acid solution was dropped on the surface of the coating film heated to 50° C. using a gradient oven, and after maintaining an overheated state for 30 minutes, the surface was rapidly washed with water. After washing with water, the moisture on the surface of the coating film was removed with a waste cloth, and the acid resistance of the test site where the sulfuric acid solution was dropped on the coating film surface was visually evaluated according to the following criteria.

⊙ (Acid resistance is very good.): The outline of the test mark can be confirmed.
○ (Acid resistance is good.): The entire test mark can be confirmed, but there is no whitening or swelling of the test mark.
Δ (Acid resistance is slightly weak.): Slight whitening and/or swelling can be confirmed in the test mark.
x (Acid resistance is weak.): Remarkable whitening and/or swelling can be confirmed in the test mark.

(Scratch Resistance)

In the evaluation of the scratch resistance of an obtained coating film, a metal cylindrical jig with a diameter of 16 mm, which was horizontal to the surface of an object to be coated on which the jig tip wears, was mounted to a plane abrasion tester manufactured by Daiei Kagaku Seiki Mfg. Co., Ltd., and felt and abrasion paper (281Q manufactured by 3M, WETORDRY PRODUCTION POLISHING PAPER 2μGRADE) were fixed to the jig tip in the order of the jig tip, the felt, and the abrasion paper. Then, a load was added to the surface of the abrasion paper fixed to the jig such that a total load of 900 g was added, and the surface of the obtained coating film was worn 10 reciprocations at a speed of 40 reciprocations per minute with a stroke length of 10 cm.

Gloss at an angle of 200 with respect to the coating film surface of a test site and an untested site was measured with a micro-TRI-gloss (a gloss meter manufactured by BYK-Chemie GmbH), and the scratch resistance was evaluated where the percentage of the quotient of the untested site to the test site was taken as a gloss retention by the abrasion test.

⊙ (Scratch resistance is very good.): Gloss retention is 85% or more.
○ (Scratch resistance is good.): Gloss retention is 75% or more and less than 85%.
Δ (Scratch resistance is slightly weak.): Gloss retention is 65% or more and less than 75%.
x (Scratch resistance is weak.): Gloss retention is less than 65%.

(Pencil Hardness)

The pencil hardness of a resulting coating film was evaluated using a pencil for a Mitsubishi pencil scratch value test. The resulting coating film was fixed on a horizontal table with the coating film surface facing upwards. Then, while a pencil prepared by scraping only the wooden part to expose the core 5 mm in a cylindrical shape and sharpening the tip of the core to be flat such that the angle was 900 was pushed with a load of 1000 g against the coating film surface at an angle of 45°, the coating film surface was scratched by pushing the pencil 20 mm at a speed of 10 mm/second. The same scratching was repeated 5 times, and the concentration code of a pencil with which scratch or tear occurred less than 2 sites out of the 5 scratched sites was evaluated as the pencil hardness of the coating film.

(High Scratch Resistance)

In the evaluation of the high scratch resistance of an obtained coating film, a metal cylindrical jig with a diameter of 16 mm, which was horizontal to the surface of an object to be coated on which the jig tip wears, was mounted to a plane abrasion tester manufactured by Daiei Kagaku Seiki Mfg. Co., Ltd., and felt and abrasion paper (281Q manufactured by 3M, WETORDRY PRODUCTION POLISHING PAPER 9μGRADE) were fixed to the jig tip in the order of the jig tip, the felt, and the abrasion paper. Then, a load was added to the surface of the abrasion paper fixed to the jig such that a total load of 900 g was added, and the surface of the obtained coating film was worn 10 reciprocations at a speed of 40 reciprocations per minute with a stroke length of 10 cm.

Gloss at an angle of 200 with respect to the coating film surface of a test site and an untested site was measured with a micro-TRI-gloss (a gloss meter manufactured by BYK-Chemie GmbH), and the scratch resistance was evaluated where the percentage of the quotient of the untested site to the test site was taken as a gloss retention by the abrasion test.

This test is a test in which the test conditions for the scratch resistance are made stricter.

⊙ (High scratch resistance is very good.): Gloss retention is 80% or more.

○ (High scratch resistance is good.): Gloss retention is 70% or more and less than 80%.

Δ (High scratch resistance is slightly weak.): Gloss retention is 60% or more and less than 70%.

x (High scratch resistance is weak.): Gloss retention is less than 60%.

With respect to Examples 1 to 19, high scratch resistance was evaluated. The results were in the range of "o" or "A" defined above. In particular, Examples 3, 5 to 7, 9 and 10 exhibited good high scratch resistance. Comparative Examples 1 to 7 (Table 16), Examples 20 to 29 (Table 17) and Comparative Examples 9 to 13 (Table 18) are as described in each table.

TABLE 15A

| Coating composition | Example | | | | | | | | |
|---|---|---|---|---|---|---|---|---|---|
|  | 1 | 2 | 3 | 4 | 5 | 6 | 7 | 8 | 9 |
| Hydroxyl group-containing resin (A1) | 60 |  | 64 | 56.5 | 63.5 | 67.5 | 60 | 60 | 60 |
| Hydroxyl group-containing resin (A2) |  | 60 |  |  |  |  |  |  |  |
| Hydroxyl group-containing resin (A3) |  |  |  |  |  |  |  |  |  |
| Melamine resin (B1-1) | 20 | 20 | 22 | 19.0 | 21.5 | 22.5 | 20 |  | 20 |
| Melamine resin (B1-2) |  |  |  |  |  |  |  | 20 |  |
| Half-ester group-containing copolymer (C1) | 10 | 10 | 3 | 15.0 | 10 | 5 | 5 | 10 | 10 |
| Half-ester group-containing copolymer (C2) |  |  |  |  |  |  |  |  |  |
| Half-ester group-containing copolymer (C3) |  |  |  |  |  |  |  |  |  |
| Half-ester group-containing copolymer (C4) |  |  |  |  |  |  |  |  |  |
| Half-ester group-containing copolymer (C5) |  |  |  |  |  |  |  |  |  |
| Half-ester group-containing copolymer (C6) |  |  |  |  |  |  |  |  |  |
| Half-ester group-containing copolymer (C7) |  |  |  |  |  |  |  |  |  |
| Half-ester group-containing copolymer (C8) |  |  |  |  |  |  |  |  |  |
| Copolymer containing no half-ester group (C9) |  |  |  |  |  |  |  |  |  |
| Copolymer (C10) |  |  |  |  |  |  |  |  |  |
| Blocked isocyanate curing agent (D1) | 10 | 10 | 11 | 9.5 | 5 | 5 | 15 | 10 |  |
| Blocked isocyanate curing agent (D2) |  |  |  |  |  |  |  |  | 10 |
| Blocked isocyanate curing agent (D3) |  |  |  |  |  |  |  |  |  |
| Curing catalyst | 0.3 | 0.3 | 0.3 | 0.3 | 0.3 | 0.3 | 0.3 | 0.3 | 0.3 |
| Microgel or non-aqueous dispersion type acrylic resin | 2.5 | 2.5 | 2.5 | 2.5 | 2.5 | 2.5 | 2.5 | 2.5 | 2.5 |
| BYK-310 | 0.1 | 0.1 | 0.1 | 0.1 | 0.1 | 0.1 | 0.1 | 0.1 | 0.1 |
| Total acid value of half-ester group-containing copolymer (mg KOH/g) | 140 | 140 | 140 | 140 | 140 | 140 | 140 | 140 | 140 |
| Smoothness | ⊙ | ⊙ | ○ | ⊙ | ○ | ○ | ○ | ⊙ | ⊙ |
| Sharpness | ⊙ | ⊙ | ○ | ⊙ | ○ | ○ | ○ | ⊙ | ⊙ |
| Brightness | ⊙ | ⊙ | ○ | ⊙ | ○ | ○ | ○ | ⊙ | ⊙ |
| Acid resistance | ⊙ | ⊙ | ○ | ○ | ○ | ○ | ○ | ○ | ○ |
| Scratch resistance | ○ | ○ | ⊙ | ○ | ⊙ | ⊙ | ⊙ | ○ | ○ |
| Pencil hardness | F | F | H | F | F | H | H | F | F |

TABLE 15B

| Coating composition | Example | | | | | | | | | |
|---|---|---|---|---|---|---|---|---|---|---|
|  | 10 | 11 | 12 | 13 | 14 | 15 | 16 | 17 | 18 | 19 |
| Hydroxyl group-containing resin (A1) | 60 | 60 | 60 | 60 | 60 | 60 |  | 52 | 67 | 67.5 |
| Hydroxyl group-containing resin (A2) |  |  |  |  |  |  |  |  |  |  |
| Hydroxyl group-containing resin (A3) |  |  |  |  |  |  | 60 |  |  |  |
| Melamine resin (B1-1) | 20 | 20 | 20 | 20 | 20 | 20 | 20 | 20 | 30 | 22.5 |
| Melamine resin (B1-2) |  |  |  |  |  |  |  |  |  |  |
| Half-ester group-containing copolymer (C1) | 10 |  |  |  |  |  |  | 10 | 20 | 3 | 10.0 |
| Half-ester group-containing copolymer (C2) |  | 10 |  |  |  |  |  |  |  |  |
| Half-ester group-containing copolymer (C3) |  |  | 10 |  |  |  |  |  |  |  |
| Half-ester group-containing copolymer (C4) |  |  |  | 10 |  |  |  |  |  |  |
| Half-ester group-containing copolymer (C5) |  |  |  |  | 10 |  |  |  |  |  |
| Half-ester group-containing copolymer (C6) |  |  |  |  |  | 10 |  |  |  |  |
| Half-ester group-containing copolymer (C7) |  |  |  |  |  |  |  |  |  |  |
| Half-ester group-containing copolymer (C8) |  |  |  |  |  |  |  |  |  |  |
| Copolymer containing no half-ester group (C9) |  |  |  |  |  |  |  |  |  |  |
| Copolymer (C10) |  |  |  |  |  |  |  |  |  |  |
| Blocked isocyanate curing agent (D1) |  | 10 | 10 | 10 | 10 | 10 | 10 | 8 |  |  |
| Blocked isocyanate curing agent (D2) |  |  |  |  |  |  |  |  |  |  |
| Blocked isocyanate curing agent (D3) | 10 |  |  |  |  |  |  |  |  |  |
| Curing catalyst | 0.3 | 0.3 | 0.3 | 0.3 | 0.3 | 0.3 | 0.3 | 0.3 | 0.3 | 0.3 |
| Microgel or non-aqueous dispersion type acrylic resin | 2.5 | 2.5 | 2.5 | 2.5 | 2.5 | 2.5 | 2.5 | 2.5 | 2.5 | 2.5 |

TABLE 15B-continued

| Coating composition | Example | | | | | | | | | |
|---|---|---|---|---|---|---|---|---|---|---|
| | 10 | 11 | 12 | 13 | 14 | 15 | 16 | 17 | 18 | 19 |
| BYK-310 | 0.1 | 0.1 | 0.1 | 0.1 | 0.1 | 0.1 | 0.1 | 0.1 | 0.1 | 0.1 |
| Total acid value of half-ester group-containing copolymer (mg KOH/g) | 140 | 6 | 10 | 236 | 140 | 140 | 140 | 140 | 140 | 140 |
| Smoothness | ⊙ | ⊙ | ○ | ○ | ○ | ⊙ | ⊙ | ⊙ | ○ | ⊙ |
| Sharpness | ⊙ | ⊙ | ○ | ○ | ○ | ⊙ | ⊙ | ⊙ | ○ | ○ |
| Brightness | ⊙ | ⊙ | ○ | ○ | ○ | ⊙ | ⊙ | ⊙ | ○ | ⊙ |
| Acid resistance | ○ | ○ | ⊙ | ⊙ | ⊙ | ○ | ○ | ○ | ○ | ○ |
| Scratch resistance | ○ | ○ | ○ | ○ | ○ | ○ | ○ | ○ | ○ | ○ |
| Pencil hardness | F | F | F | F | H | HB | HB | HB | H | F |

TABLE 16

| Coating composition | Comparative Example | | | | | | |
|---|---|---|---|---|---|---|---|
| | 1 | 2 | 3 | 4 | 5 | 6 | 7 |
| Hydroxyl group-containing resin (A1) | 65 | 60 | 60 | 60 | 60 | 60 | 60 |
| Hydroxyl group-containing resin (A2) | | | | | | | |
| Hydroxyl group-containing resin (A3) | | | | | | | |
| Melamine resin (B1-1) | 35 | 30 | 20 | 20 | 20 | 20 | 20 |
| Melamine resin (B1-2) | | | | | | | |
| Half-ester group-containing copolymer (C1) | | | | | | | |
| Half-ester group-containing copolymer (C2) | | | | | | | |
| Half-ester group-containing copolymer (C3) | | | | | | | |
| Half-ester group-containing copolymer (C4) | | | | | | | |
| Half-ester group-containing copolymer (C5) | | | | | | | |
| Half-ester group-containing copolymer (C6) | | | | | | | |
| Half-ester group-containing copolymer (C7) | | | | 10 | | | |
| Half-ester group-containing copolymer (C8) | | | | | 10 | | |
| Copolymer containing no half-ester group (C9) | | | | | | 10 | |
| Copolymer (C10) | | | | | | | 10 |
| Blocked isocyanate curing agent (D1) | | 10 | | 10 | 10 | 10 | 10 |
| Blocked isocyanate curing agent (D2) | | | | | | | |
| Blocked isocyanate curing agent (D3) | | | 20 | | | | |
| Curing catalyst | 0.3 | 0.3 | 0.3 | 0.3 | 0.3 | 0.3 | 0.3 |
| Microgel or non-aqueous dispersion type acrylic resin | 2.5 | 2.5 | 2.5 | 2.5 | 2.5 | 2.5 | 2.5 |
| BYK-310 | 0.1 | 0.1 | 0.1 | 0.1 | 0.1 | 0.1 | 0.1 |
| Total acid value of half-ester group-containing copolymer (mg KOH/g) | — | — | — | 3 | 140 | 20 | — |
| Smoothness | Δ | Δ | Δ | ○ | ⊙ | X | Resin |
| Sharpness | X | Δ | X | ○ | ⊙ | X | C10 |
| Brightness | X | X | Δ | X | Δ | X | Gelation |
| Acid resistance | X | Δ | Δ | X | X | ○ | |
| Scratch resistance | ○ | ○ | X | X | X | Δ | |
| High scratch resistance | Δ | Δ | X | X | X | X | |
| Pencil hardness | F | F | B | B | B | F | |

As shown above, the present disclosure can provide a coating composition capable of forming a coating film having good appearance and good design and having well-balanced coating film properties such as scratch resistance. For example, the coating film are superior in smoothness, sharpness, and brightness and also superior in acid resistance and scratch resistance.

On the other hand, in Comparative Examples 1 to 3, since no half ester group-containing copolymer (C) according to the present invention was not contained, coating films being particularly poor in smoothness, sharpness, brightness, and acid resistance were obtained.

In Comparative Example 4, since the total acid value of the half-ester group-containing copolymer (C) was outside the scope of the present invention, a coating film being remarkably poor in brightness, acid resistance, and scratch resistance was obtained.

In Comparative Example 5, the number of carbon atoms of the alcohol used in the half-esterification in the half-ester group-containing copolymer (C) was outside the scope of the present invention, and a coating film being poor in brightness and remarkably poor in acid resistance and scratch resistance was obtained.

In Comparative Example 6, since half-esterification was not performed, a coating film being extremely poor in smoothness, sharpness, and brightness and poor in scratch resistance was obtained.

In Comparative Example 7, since gelation occurred during the preparation of the copolymer (C10), a clear coating composition could not be prepared.

Comparative Example 8

Similarly, as Comparative Example 8, an attempt was made to prepare a copolymer using a polyol (trimethylolpropane) in the copolymer prepared in Production Example C1.

However, gelation occurred during the preparation, and a coating composition could not be prepared.

Examples 20 to 29, Comparative Examples 9 to 14

Examples and Comparative Examples Containing Unblocked Isocyanate Curing Agent (B2)

A multilayer coating film was formed in the same manner as in Example 1 except that the components were mixed in accordance with the formulation shown in Table 17.

The above-described evaluations were performed for the respective obtained coating films for testing.

TABLE 17

|  | Example | | | | | | | | | |
| --- | --- | --- | --- | --- | --- | --- | --- | --- | --- | --- |
| Coating composition | 20 | 21 | 22 | 23 | 24 | 25 | 26 | 27 | 28 | 29 |
| Hydroxyl group-containing resin (A1-2) | 57 | | 54 | 59 | 57 | 57 | 57 | 57 | 57 | 57 |
| Hydroxyl group-containing resin (A2-2) | | 62 | | | | | | | | |
| Unblocked isocyanate curing agent (B2-1) | 38 | 33 | 36 | 39 | 38 | 38 | 38 | 38 | 38 | 38 |
| Half-ester group-containing copolymer (C11) | 5 | 5 | 10 | 2 | | | 5 | 5 | 5 | 5 |
| Half-ester group-containing copolymer (C2) | | | | | 5 | | | | | |
| Half-ester group-containing copolymer (C4) | | | | | | 5 | | | | |
| Half-ester group-containing copolymer (C7) | | | | | | | | | | |
| Organic-inorganic hybrid polymer dispersion (E1) | | | | | | | 1 | 5 | | |
| Inorganic particles (E2) | | | | | | | | | 3 | |
| Organic resin-coated inorganic particles (E3) | | | | | | | | | | 3 |
| BYK-310 | 0.1 | 0.1 | 0.1 | 0.1 | 0.1 | 0.1 | 0.1 | 0.1 | 0.1 | 0.1 |
| Smoothness | ⊙ | ⊙ | ⊙ | ○ | ○ | ○ | ⊙ | ⊙ | ⊙ | ⊙ |
| Sharpness | ○ | ⊙ | ⊙ | ○ | ○ | ○ | ○ | ○ | ○ | ○ |
| Brightness | ⊙ | ⊙ | ⊙ | ○ | ○ | ⊙ | ⊙ | ⊙ | ⊙ | ⊙ |
| Acid resistance | ⊙ | ⊙ | ○ | ⊙ | ⊙ | ⊙ | ⊙ | ⊙ | ⊙ | ⊙ |
| Scratch resistance | ⊙ | ⊙ | ⊙ | ⊙ | ⊙ | ⊙ | ⊙ | ⊙ | ⊙ | ⊙ |
| Pencil hardness | F | F | HB | F | F | F | F | F | F | F |
| High scratch resistance | ○ | ○ | ○ | ○ | ○ | ○ | ⊙ | ⊙ | ⊙ | ⊙ |

TABLE 18

|  | Comparative Example | | | | |
| --- | --- | --- | --- | --- | --- |
| Coating composition | 9 | 10 | 11 | 12 | 13 |
| Hydroxyl group-containing resin (A1-2) | 60 | 57 | 60 | 60 | 60 |
| Hydroxyl group-containing resin (A2-2) | | | | | |
| Unblocked isocyanate curing agent (B2-1) | 40 | 38 | 40 | 40 | 40 |
| Half-ester group-containing copolymer (C11) | | | | | |
| Half-ester group-containing copolymer (C2) | | | | | |
| Half-ester group-containing copolymer (C4) | | | | | |
| Half-ester group-containing copolymer (C7) | | 5 | | | |
| Organic-inorganic hybrid polymer dispersion (E1) | | | 5 | | |
| Inorganic particles (E2) | | | | 3 | |
| Organic resin-coated inorganic particles (E3) | | | | | 3 |
| BYK-310 | 0.1 | 0.1 | 0.1 | 0.1 | 0.1 |
| Smoothness | ○ | ○ | Δ | Δ | Δ |
| Sharpness | X | Δ | X | X | X |
| Brightness | Δ | X | Δ | Δ | Δ |
| Acid resistance | Δ | X | ○ | ○ | ○ |
| Scratch resistance | ○ | Δ | ○ | ○ | ○ |
| Pencil hardness | F | HB | F | F | F |
| High scratch resistance | ○ | X | ⊙ | ⊙ | ⊙ |

As shown above, the present disclosure can provide a coating composition capable of forming a coating film having good appearance and good design and having well-balanced coating film properties such as scratch resistance. For example, the coating film is superior in smoothness, sharpness, and brightness and also superior in acid resistance and scratch resistance.

Moreover, the present disclosure can form a coating film being higher in scratch resistance, that is, also being superior in high scratch resistance.

On the other hand, in Comparative Examples 9 to 13, since no prescribed half-ester group-containing copolymer (C) according to the present invention was not contained, coating films being particularly poor in smoothness, sharpness, brightness, and acid resistance were obtained. Further, as shown in Comparative Example 10, when a half-ester group-containing copolymer deviating from the prescribed physical property values according to the present disclosure was added, a coating film remarkably poor in brightness, acid resistance, scratch resistance, and high scratch resistance was obtained.

INDUSTRIAL APPLICABILITY

According to the present invention, there is provided a coating composition capable of forming a coating film having good appearance and design of the coating film and having coating film properties such as scratch resistance with a good balance. Furthermore, the present invention provides a method for forming a multilayer coating film including forming a coating film using the coating composition of the present invention.

The invention claimed is:

1. A coating composition consisting essentially of:
   a hydroxyl group-containing acrylic resin (A);
   a melamine resin (B1);
   a half-ester group-containing copolymer (C) that is a copolymer of a polymerizable unsaturated monomer (a) having a half-esterified acid anhydride group and another copolymerizable monomer (b); and
   a blocked isocyanate compound (D),
   wherein
   the polymerizable unsaturated monomer (a) has an acid anhydride group half-esterified with a monoalcohol having 1 to 8 carbon atoms, and
   a total acid value of the half-ester group-containing copolymer (C) is 5.0 mgKOH/g or more and 240 mgKOH/g or less.

2. The coating composition according to claim 1, wherein a number-average molecular weight of the half-ester group-containing copolymer (C) is 1000 or more and 10500 or less.

3. The coating composition according to claim 1, wherein an acid value of the half-ester group-containing copolymer (C) is 10 mgKOH/g or more and 240 mgKOH/g or less.

4. The coating composition according to claim 1, wherein a hydroxyl value of the hydroxyl group-containing acrylic resin (A) is 60 mgKOH/g or more and 200 mgKOH/g or less.

5. The coating composition according to claim 1, wherein a content of the half-ester group-containing copolymer (C) is 3 parts by mass or more and 25 parts by mass or less per 100 parts by mass of a resin solid content of the coating composition.

6. The coating composition according to claim 1, wherein a ratio of the melamine resin (B1) and the half-ester group-containing copolymer (C) contained in the coating composition is the melamine resin (B1)/the half-ester group-containing copolymer (C)=1/0.1 to 1/1 as expressed in solid content mass ratio.

7. The coating composition according to claim 1, further comprising a particulate additive (E) including at least one species selected from the group consisting of an organic-inorganic hybrid polymer dispersion, an inorganic particle, and an organic resin-coated inorganic particle.

8. The coating composition according to claim 7, wherein the average particle diameter of the particulate additive (E) is 10 nm or more and 1000 nm or less.

9. The coating composition according to claim 1, wherein the coating composition is a clear coating composition.

10. A method for forming a multilayer coating film, comprising:
a step of applying a base coating composition to an object to be coated to form a base coating film or an uncured base coating film; and
a step of applying the coating composition according to claim 1 to the base coating film or to the uncured base coating film to form a coating film.

11. A method for forming a multilayer coating film, comprising:
a step of applying a primer surfacer composition to an object to be coated to form a primer surfacer film or an uncured primer surfacer film,
a step of applying a base coating composition to the resulting primer surfacer film or the uncured primer surfacer film to form a base coating film or an uncured base coating film, and
a step of applying the coating composition according to claim 1 to the base coating film or the uncured base coating film to form a coating film.

* * * * *